United States Patent [19]
Farrell

[11] Patent Number: 5,881,166
[45] Date of Patent: Mar. 9, 1999

[54] METHOD AND SYSTEM FOR GENERATING A HISTOGRAM OF A SCANNED IMAGE

[75] Inventor: Barbara L. Farrell, Ontario, N.Y.

[73] Assignee: Xerox Corporation, Stamford, Conn.

[21] Appl. No.: 755,529

[22] Filed: Nov. 21, 1996

[51] Int. Cl.[6] .............................. G06K 9/00; G06K 9/38
[52] U.S. Cl. ............................................ 382/168; 382/172
[58] Field of Search ................................... 382/168, 172; 358/455–458, 464–466, 522; 345/440

[56] References Cited

U.S. PATENT DOCUMENTS 5,282,061  1/1994  Farrell ...................................... 358/464
5,293,340  3/1994  Fujita ....................................... 365/201

*Primary Examiner*—Leo H. Boudreau
*Assistant Examiner*—Dmitry A. Novik
*Attorney, Agent, or Firm*—Michael J. Nickerson

[57] ABSTRACT

A system and method generates a histogram of a scanned image by determining a number of pixels of the image to be scanned to generate the histogram. It is then determined whether the determined number of pixels is less than or equal to a capacity of a histogram buffer. The image is scanned to generate pixels having grey values associated therewith and a portion of the generated pixels is stored in the histogram buffer if it is determined that the number of pixels exceeds the capacity of the histogram buffer, thereby generating a histogram of the image.

9 Claims, 22 Drawing Sheets

METHOD AND SYSTEM FOR GENERATING A HISTOGRAM OF A SCANNED IMAGE

FIELD OF THE PRESENT INVENTION

The present invention is directed to a system or method for generating and utilizing histogram data from a scanned image. More specifically, the present invention is directed to a system or method for creating histogram data and establishing background (white threshold) and black threshold values for the scanned image.

BACKGROUND OF THE PRESENT INVENTION

In a conventional reproduction machine, a document (image) is scanned so that light reflected from the document causes a latent image of electrical charges to form on a photoreceptor. This latent image is then developed with toner, and the toner is transferred to a recording medium to produce a copy of the scanned document. These systems are commonly referred to as light-lens or non-digital copying systems.

The quality of a light-lens reproduction machine is a function of how well the copy matches the original. As is well know, various factors can impact this quality. For example, the scanning station can impact the quality if the optical path of the scanning station is not properly aligned. Also, the development station can impact the quality if a photoreceptor is not properly cleaned.

With the advent of digital reproduction machines, the above copy process for making a copy has changed. In a digital process, a document or image is scanned by a digital scanner which converts the light reflected from the document into electrical charges representing the light intensity from predetermined areas (pixels) of the document. These charges, after suitable lo processing, are converted into image signals or pixels of image data to be used by the digital reproduction machine to recreate the scanned image.

The pixels of image data are processed by an image processing system which converts the pixels of image data into signals which can be utilized by a printing device to recreate the scanned image. This printing device may be either a xerographic printer, ink jet printer, thermal printer, or any other type of printing device which is capable of converting digital data into a mark on a recording medium.

As with the light-lens systems, the quality of a reproduction machine is still a function of how well the copy matches the original. However, in this digital environment, other factors can now contribute to or impact the quality of the reproduced image. For example, the scanner can impact the quality if the scanner is not properly calibrated. Also, the output (printing) device can impact the quality if a printhead is clogged or a photoreceptor is not properly cleaned. But, the aspect of the digital system which can have the greatest impact is the digital (image) processing of the image data because a digital machine must convert light to a digital signal and then convert the digital signal to a mark on a recording medium In other words, the image processing system provides the transfer function between the light reflected from the document to the mark on the recording medium.

Quality can be measured in many different ways. One way is to look at the characteristics of the reproduced image. An example of such a characteristic for determining the quality of the reproduced image is the contrast of the image. The contrast of an imaged (copied) document is the most commonly used characteristic for measuring quality since contrast provides a good overall assessment of the image's quality.

In a digital reproduction machine, the image processing system can greatly impact the contrast of the image. Thus, to assure high quality at the output printing device, it is desirable to know the contrast of the image being scanned prior to the image processing stage because, with this knowledge, the image processing system can process the image data so that the reproduced image has the proper contrast. One way of obtaining this contrast information prior to digital image processing is for the digital reproduction machine to generate a grey level histogram, which gives an easy to read measure of the image contrast. The image or grey level histogram describes the statistical distribution of grey levels of an image in terms of the number of pixels at each grey level. In other words, the number of pixels within an image that are associated with a certain grey level.

A histogram can be represented graphically with intensity on the horizontal axis from 0 to 255, if an eight-bit per pixel sampling resolution is utilized, and the number of pixels on the vertical axis. Using this graphical representation, a histogram can illustrate whether an image is basically dark or light and high or low contrast. It is important to know that when an image is represented by histogram, all spatial information is lost. The histogram specifies the number of pixels of each grey level but gives no indication where these pixels are located in the image. In other words, very different images may have very similar histograms.

Conventionally, when creating a histogram of the scanned image, a digital reproduction system samples a document, collects intensive data from the document, and uses this intensity information to determine the document's background value. In such conventional systems, the computed background value of the document represents the average intensity of the document.

While this conventional approach produces reasonable results for many documents, the conventional approach is sensitive to the image's composition and is also insensitive to intensity variations within a document's background. As the make up of the document shifts in character from predominantly background to text and graphics, the value reported by an averaging scheme will change proportionally. If the magnitude of this change is significant, the area corresponding to the change will manifest itself in the output copy of the scanned document as a thinning or loss of fine lines and characters.

Therefore, it is desirable to utilize a system and method for generating histogram data which is insensitive to the image composition in the sampled area and is sensitive to intensity variations within the document's background. When utilizing such a system or method, the background value and black threshold value of the document will not change as the sample region shifts in character from predominantly background to text and graphics, and thus, the output copy from the printing device will not realize a thinning or loss of fine lines and characters.

SUMMARY OF THE PRESENT INVENTION

One aspect of the present invention is a method for generating a histogram of a scanned image. The method determines a number of pixels of the image to be scanned to generate the histogram; determines if the number of pixels determined is less than or equal to a capacity of a histogram buffer; scans the image to generate pixels having grey values associated therewith; and stores a portion of the generated pixels in the histogram buffer when it is determined that the number of pixels exceed the capacity of the histogram buffer, thereby generating a histogram of the image.

A second aspect of the present invention is a system for generating a histogram of a scanned image. The system includes a histogram buffer; means for determining a number of pixels of the image to be scanned to generate the histogram; comparator means for determining if the determined number of pixels is less than or equal to a capacity of the histogram buffer; a scanning device to scan the image to generate a plurality of pixels having grey values associated therewith; and gate means for passes a portion of the generated pixels to the histogram buffer when the determined number of pixels exceed the capacity of the histogram buffer, thereby generating a histogram of the image.

A third aspect of the present invention is a system for creating a histogram of an image. The system includes a histogram buffer; control means for determining a number of pixels of the image to be scanned to generate the histogram and for determining if the number of pixels is within a capacity of the histogram buffer; a scanning device, operatively connected to the control means, to scan the image; and a gate circuit, operatively connected to the control means, the scanning device, and the histogram buffer, to pass a calculated percentage of the number of pixels generated by the scanning device to the histogram buffer for storage.

Further objects and advantages of the present invention will become apparent from the detailed description provided below.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
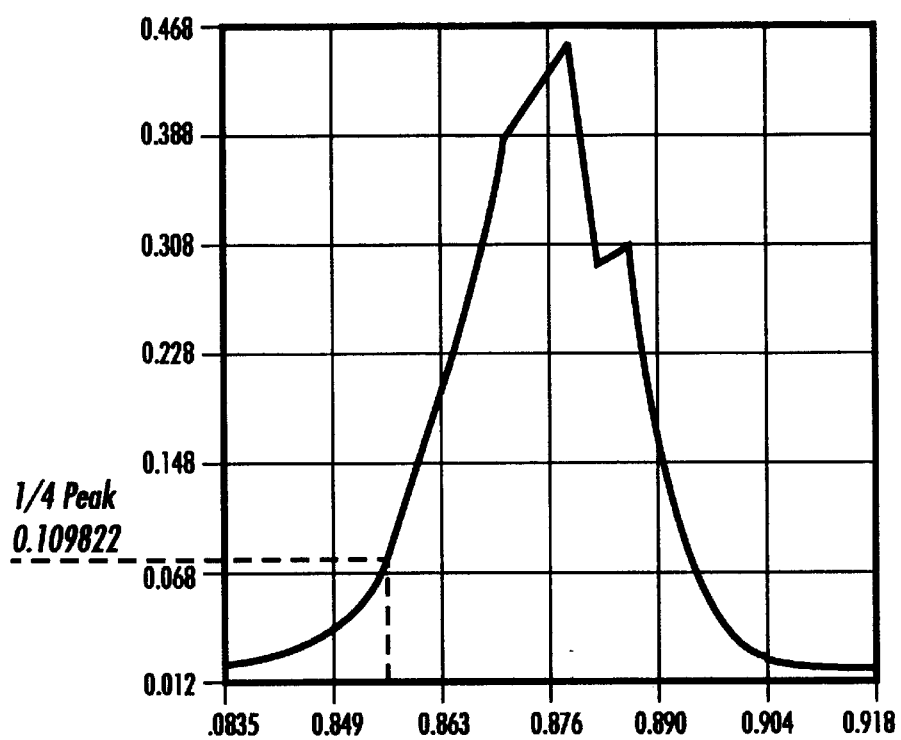
FIG. 1 is a graphical representation of a histogram distribution for a scanned sheet of white paper.

The following will be a detailed description of the drawings illustrating the present invention. In this description, as well as in the drawings, like referenced numbers represent devices, circuits, or equivalent circuits which perform the same or equivalent functions.

As noted above, it is desirable to generate a background value which is not sensitive to the image's composition and is sensitive to intensity variations within a document's background. To calculate this background value, a histogram of the video pixels representing the scanned image is obtained.

In the preferred embodiment of the present invention, the video pixels used to generate the histogram are from within a programmed window location near the leading edge of the image (document). Moreover, in the preferred embodiment of the present invention, the histogram and the background value of the image are generated during a single scan of the image.

Upon obtaining the histogram data, the values, white peak and white threshold, are determined. More specifically, the white peak value is the grey level with greatest number of pixels having an intensity related to the background (white) value of the image being scanned. Moreover, the white threshold value is the actual background value to be used in the image processing system calculated from the histogram data.

An example of a histogram distribution is illustrated in FIG. 1. FIG. 1 shows a normalized histogram distribution for a scanned sheet of white paper. It is noted that the histogram distribution values illustrated in FIG. 1 have been normalized so that the maximum bin value is 0.45577 and the histogram scale has been normalized from a 0 to 255 range to a 0 to 1 range. The distribution is centered about the mean pixel value which is 0.875238. The standard deviation of this distribution of data has been calculated to be 0.875301.

Figure 2:
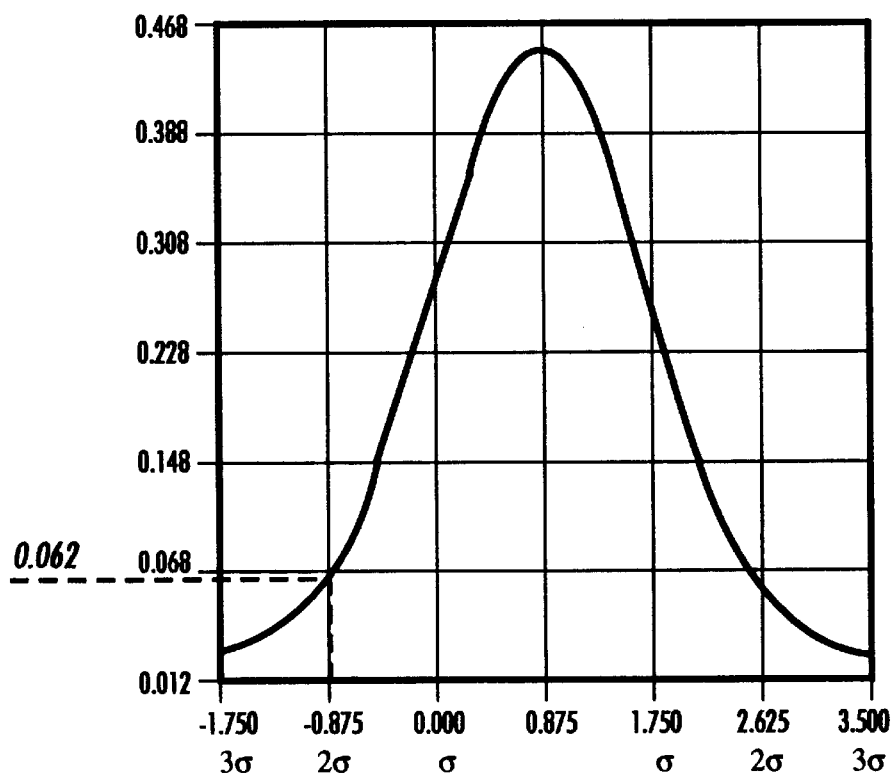
FIG. 2 is a graphical representation illustrating a normal Gaussian distribution curve having the same mean and standard deviation as the distribution illustrated in FIG. 1.

In comparison, FIG. 2 shows a normal Gaussian distribution curve having the same mean (0.875238) and same standard deviation value (0.875301) as in FIG. 1. As demonstrated by the illustrated distributions illustrated, the histogram distribution of the background video of a white piece of paper may be approximated by a normal Gaussian distribution curve.

Histogram data can be generated in many ways. For example, an entire image can be scanned and each pixel of the image is placed in a corresponding grey level bin to generate the histogram On the other hand, according to a preferred embodiment of the present invention, only a window or subsample of the entire image needs to be gather to create a histogram so as to determine the background value and black threshold value of the image.

In such a situation, the histogram sample window is defined by four coordinates, the number of scanlines to be sampled (bottom), the number of leading scanlines to skip (in slowscan direction) before sampling begins (top), the number of leading pixels to skip (in fastscan direction) before sampling begins (left), and the number of pixels within a scanline to be sampled (right). There are no limits on the number of pixels or scanlines which may be skipped or sampled as long as the sample window falls within the image being scanned. An example of such a histogram sample window is illustrated in FIG. 15.

Figure 15:
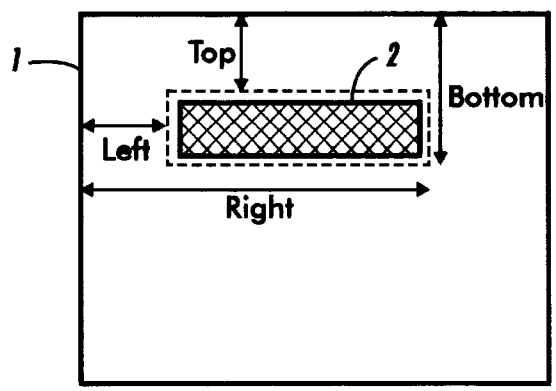
FIG. 15 is a graphical representation of a sample window used to generate the histogram data according to the present invention.

As illustrated in FIG. 15, the image 1 is scanned wherein a sample window 2 of the scanned image data is utilized to create the histogram distribution or data. This sample window 2 is defined by a left coordinate, top coordinate, bottom coordinate, and right coordinate as defined above. From the histogram information gathered in the sample window, the present invention can utilize the shape of a histogram distribution to determine both the background value of the document and the black threshold value of the document.

Figure 17:
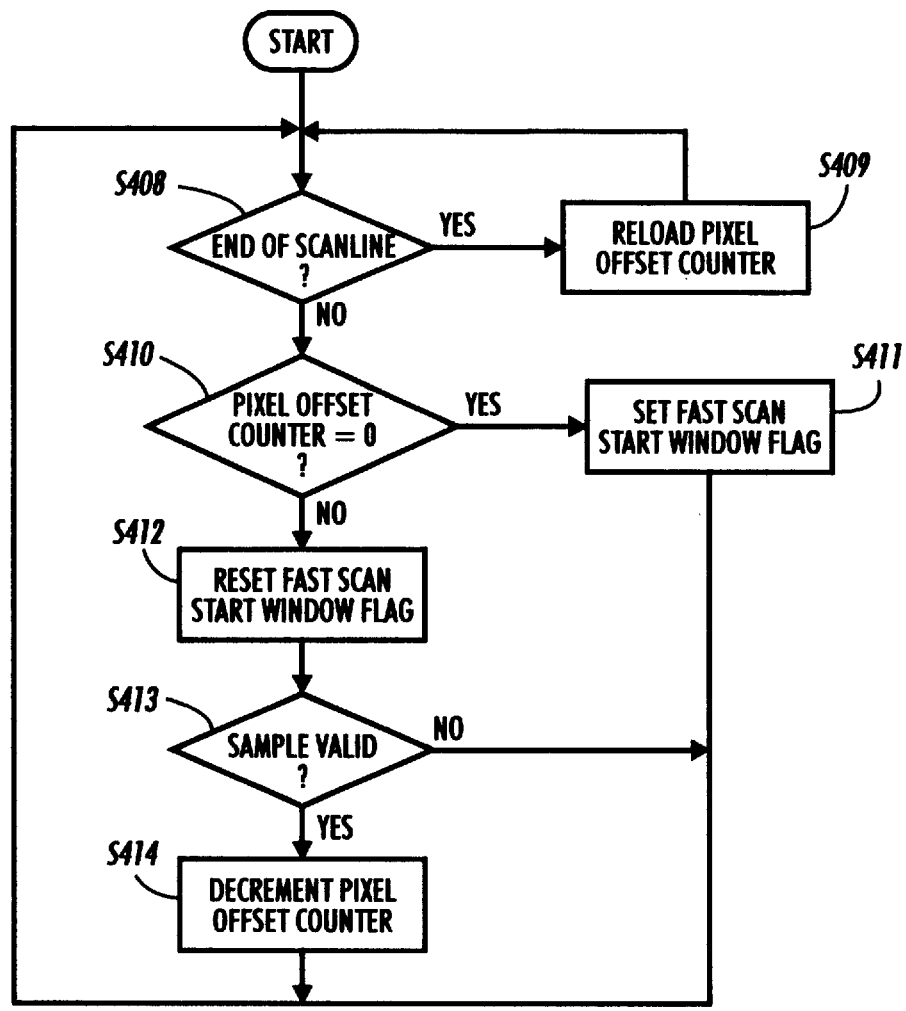
FIG. 17 is a flowchart illustrating the determination of the leading edge of the sample window in a fastscan direction.

FIG. 17 illustrates a flowchart showing a process for determining the leading edge of the sample window in a fastscan direction. Fastscan direction refers to the scanning of the image through the electronic scanning of the CCD or full width array sensor. As illustrated in FIG. 17, step S408 determines whether the end of a scanline has been reached. If the end of the scanline has been reached, step S409 reloads the pixel offset counter to the value representing the number of pixels to be skipped in the fastscan direction.

On the other hand, if step S408 determines that the end of the scanline has not been reached, step S410 determines whether the pixel offset counter is equal to 0. If the pixel offset counter is equal to 0, step S411 sets the fastscan start window flag to 1. Moreover, if the pixel offset counter is not equal to 0, step S412 resets the fastscan start window flag to 0. The process then determines whether the sample pixel is valid image data at step S413. If the sample is valid, a pixel offset counter is decremented at step S414.

Figure 16:
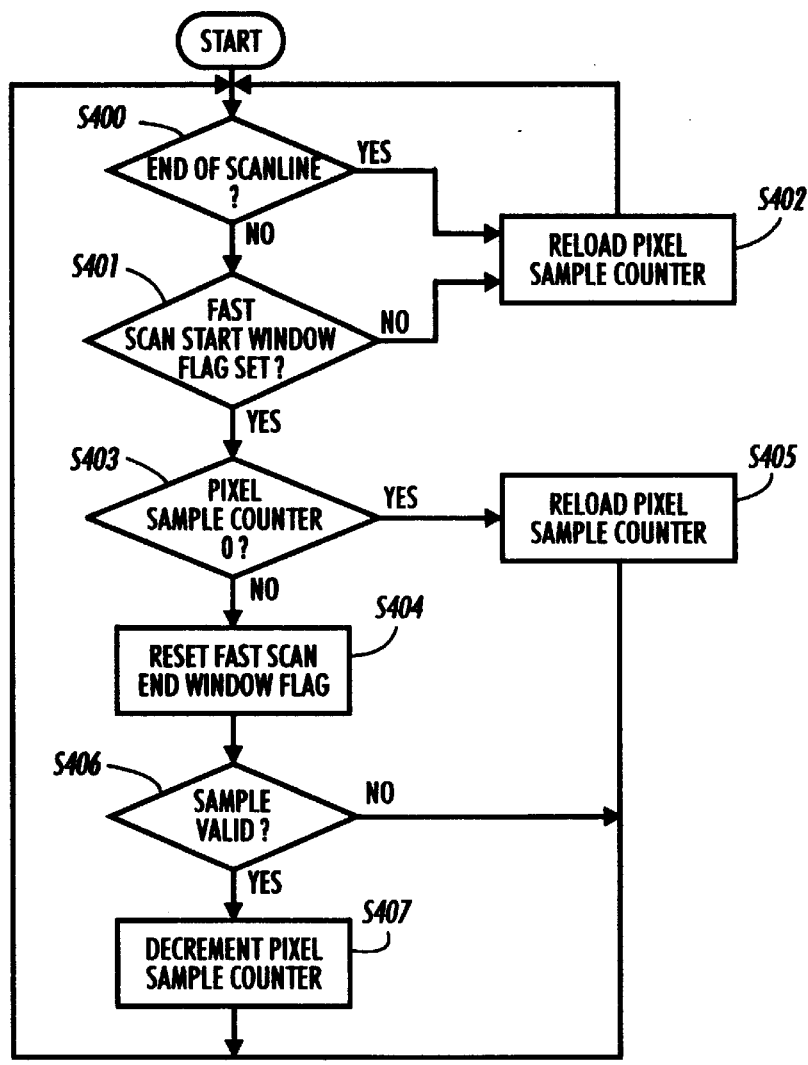
FIG. 16 is a flowchart illustrating the determination of which pixels within a scanline are to be sampled for a histogram.

FIG. 16 illustrates a flowchart showing a process for determining which pixels within a sample window to be used in generating the histogram distribution or data. As illustrated in FIG. 16, step S400 determines whether an end of scanline has been reached. If the end of scanline has been reached, step S402 reloads the pixel sample counter with the number of pixels to be sampled within a scanline. If the end of the scanline has not been reached, step S401 determines whether the fastscan start window flag has been set.

If this flag has not been set, step S402 again reloads the pixel sample counter with the number of pixels to be sampled within a scanline. On the other hand, if the fastscan start window flag is set, step S403 determines whether the pixel sample counter equals 0. If the pixel sample counter does not equal 0, step S404 resets the fastscan end window flag to 0. Moreover, if the pixel sample counter is equal to 0, step S405 sets the fastscan end window flag to 1. The process further determines at step S406 whether the sample pixel is valid. If the sample is valid, step S407 decrements the pixel sample counter.

Figure 18:
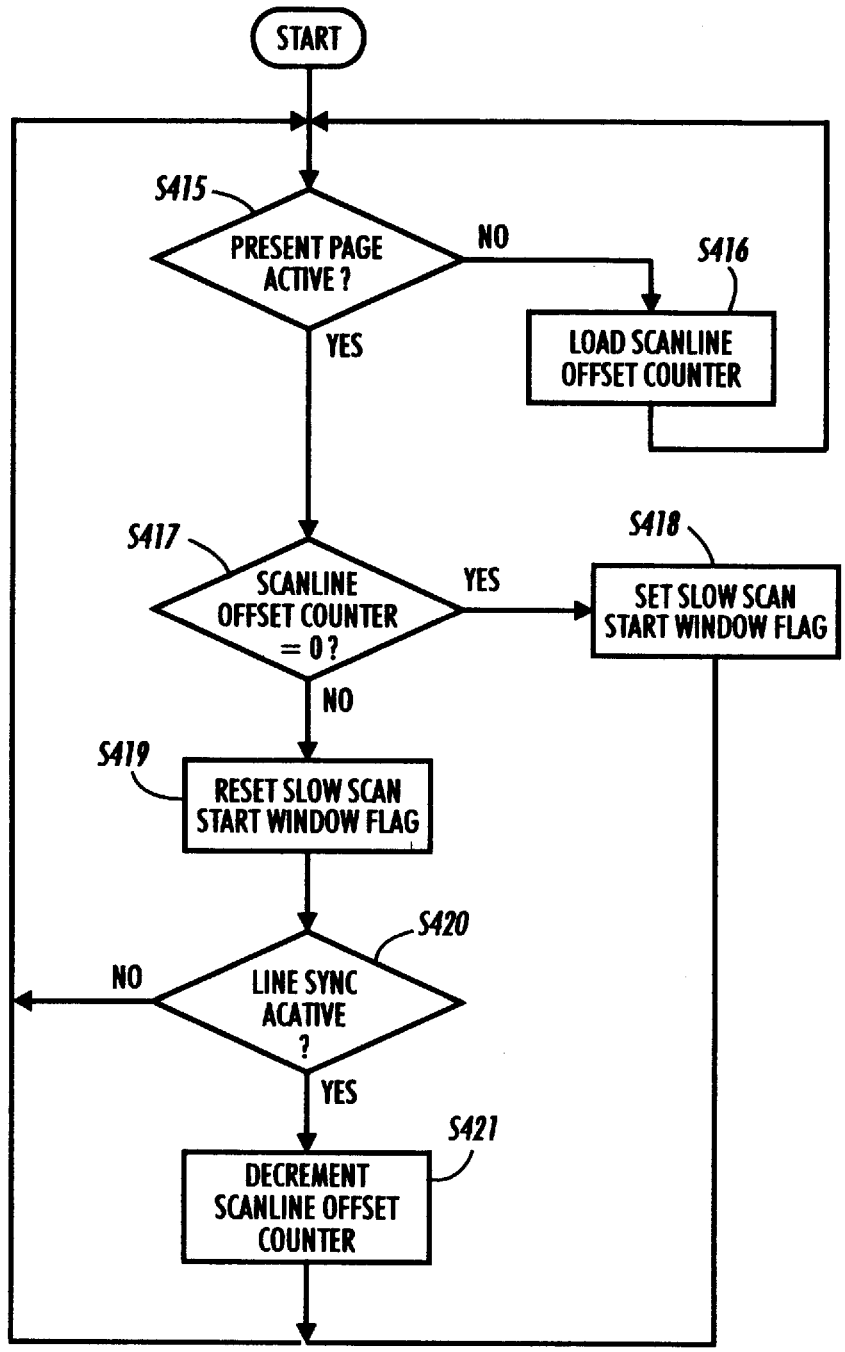
FIG. 18 is a flowchart illustrating the determination of the leading edge of the sample window in a slowscan direction.

FIG. 18 illustrates a flowchart showing the determination of the leading edge of the sample window in the slowscan direction. Slowscan direction refers to the scanning of the image through the relative physical movement between the CCD or full width array sensor and the document. As illustrated in FIG. 18, step S415 determines whether the present page of the image is active. If the present page of the image is not active, step S416 loads the scanline offset counter with the value equal to the number of scanlines skipped prior to the start of the sample window. On the other hand, if the present page is active, step S417 determines whether the scanline offset counter is equal to 0.

If the scanline offset counter is equal to 0, step S418 sets the slowscan start window flag to 1. On the other hand, if the scanline offset counter is not equal to 0, step S419 resets the slowscan start window flag to equal 0. The process then determines when the next linesync active signal is received at step S420. If the linesync signal is active, step S421 decrements to the scanline offset counter.

Figure 19:
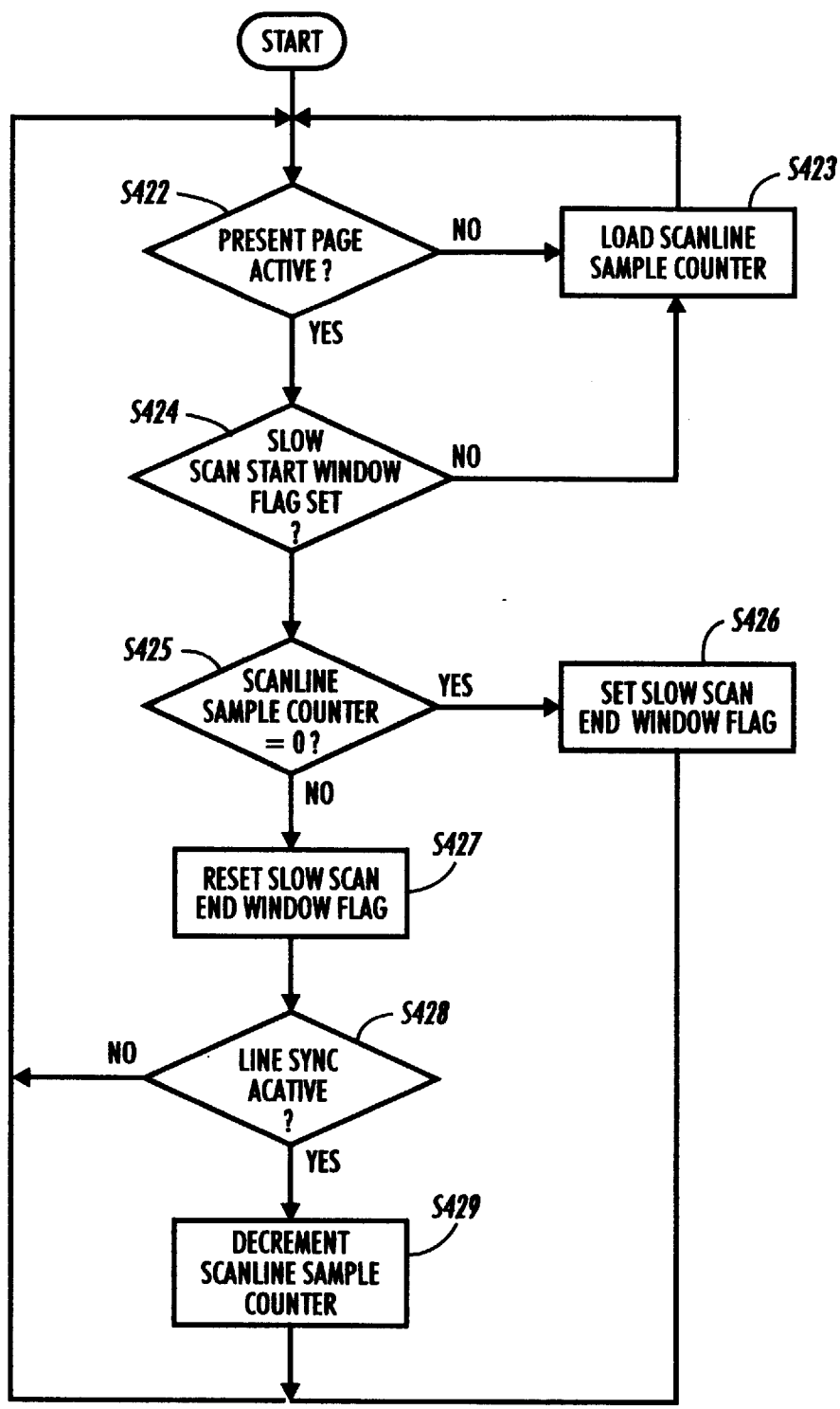
FIG. 19 is a flowchart illustrating the determination of which scanlines are to be sampled to generate the histogram data.

FIG. 19 illustrates a flowchart showing the determination of which scanlines form the actual sample window. As illustrated in FIG. 19, step S422 determines whether the present page is active. If the present page is not active, step S423 loads the scanline sample counter with a value equal to the number of scanlines making up the sample window. On the other hand, if the present page is active, step S424 determines whether the slowscan start window flag is set.

If this flag is set, step S425 determines whether the scanline sample counter is equal to 0. If the scanline sample counter is equal to 0, step S426 sets the slowscan end window flag to equal 1. However, if the scanline sample counter is not equal to 0, step S427 resets the slowscan end window flag to 0. Thereafter, step S428 determines whether the linesync signal is active. If the linesync signal is active, step S429 decrements the scanline sample counter.

Figure 20:
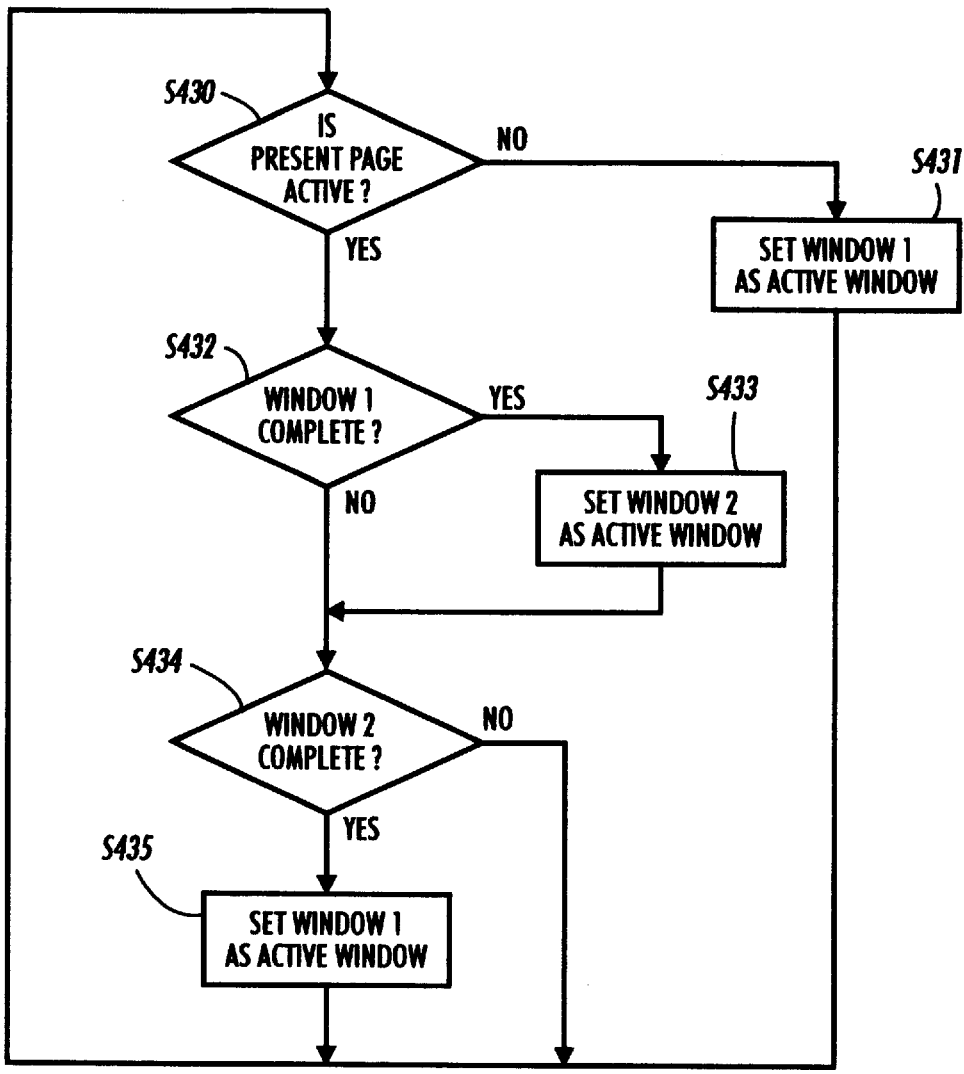
FIG. 20 is a flowchart illustrating a process for utilizing two windows to generate separate sets of histogram data.

FIG. 20 illustrates a flowchart showing the utilization of two sample windows wherein each sample window is utilized to generate a histogram for the values within the sample window such that separate background and black threshold values can be calculated for those areas corresponding to the sample window. As illustrated in FIG. 20, step S430 determines whether the present page is active. If the present page is not active, step S431 sets window 1 as the active window.

On the other hand, if the present page is active, step S432 determines whether the sampling of window 1 has been completed. If the sampling of window 1 has been completed, step S433 sets window 2 as the active window. However, if window 1 is not completed or step S433 sets window 2 as the active window, step S434 determines whether window 2 is complete. If window 2 is complete, step S435 sets window 1 as the active window.

As described above, FIG. 20 illustrates a process for utilizing two sample windows to generate histograms in a ping-pong fashion or mode. More specifically, in this ping-pong mode, each histogram is be used to calculate the white background value and the black threshold value for the image within the sample window. The white background value and the black threshold value will be calculated from the first sample window, while the second sample window is gathering histogram information. When the second sample window is completed, the white background value and the black threshold value will be calculated from the second histogram, while the first sample window is again being used to gather histogram information.

In this manner, the white background value and the black threshold value will be updated dynamically throughout the page with the histogram compilation "ping-ponging" between the two histogram distributions and sample windows. This "ping-pong" mode is useful in sampling a very large document such as an engineering drawing. In this mode, the two sample windows do not overlap. Sample window counters are simply held reset until the other sample window is completed. This saves having to use large counters and comparators. Moreover, the sample windows may still be specified with pixel and scanline offsets wherein the counting for the scanline offset of one sample window will not begin until the prior sample window has been completed.

In addition to having the capability of establishing the size of the sample window for generating the histogram data, the present invention is also capable of reducing the number of samples actually utilized within the sample window to create the histogram data, without losing histogram information. This capability is valuable when the total number of samples within a sample window exceeds the capacity of the histogram buffer. For example, if the user selects a sample window which contains 12,000 pixels but the histogram buffer has only a capacity for 3,000 pixels, the present invention randomly samples only 3,000 of the 12,000 pixels within the sample window to create the histogram distribution. In addition to using a random selection process as noted above, the present invention may also sample the pixels using various other methods such as storing every other pixel in the histogram buffer, storing only odd-numbered pixels in odd-numbered scanlines and even-numbered pixels in even-numbered scanlines in the histogram buffer, or storing a calculated percentage of the number of pixels generated by the scanning device in the histogram buffer. This reduction in the number of the samples taken from the sample window will be described in more detail below with respect to FIGS. 24–26.

Figure 26:
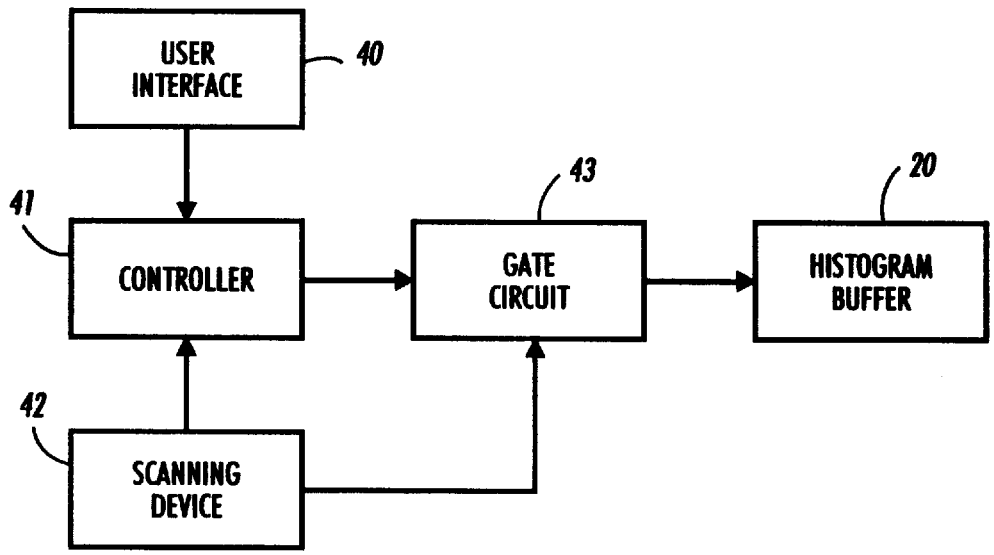
FIG. 26 is a block diagram illustrating the overall system for generating histogram data according to the present invention.

FIG. 26 illustrates a block diagram showing a system which is capable of selecting a number of samples from a sample window for generating the histogram distribution wherein the number of selected pixels is less than the total number of pixels within the sample window.

As illustrated in FIG. 26, the user interface 40 is provided so that the user can establish the location and size of the sample window to be utilized in generating the histogram data. The actual location and size of the sample window can be input utilizing various means such as a digital edit pad, number coordinates through a keyboard, or any other type of input device which allows the user to establish the location and size of the sample window. The system also includes a scanning device 42 which scans the actual image to be processed.

The scanning device 42 could also be utilized to establish the sample window by having the scanning device scan a separate document wherein a particular mark or set of marks can be utilized to define the sample window. For example, if the scanning device 42 is capable of recognizing certain colors, a color mark outlining the sample window's boundaries could be placed on a document and scanned by the scanning device such that a controller 41 would convert this information into coordinates representing the actual location and size of the sample window.

Upon receiving the location and size of the sample window from either the user interface 40 or scanning device 42, controller 41 compares the number of pixels within the sample window with the actual capacity of the histogram buffer. The actual number of pixels within the sample window can be calculated by the controller 41 from the scanning resolution selected for the image or the size of the original image as defined by the sample window. If the controller 41 determines that the number of pixels within the sample window are equal to or less than the capacity of the histogram buffer, the controller 41 enables a gate circuit 43 to pass all pixels scanned by scanning device 42 within the sample window to be stored in histogram buffer 20.

However, if controller 41 determines that the number of pixels in the sample window exceeds the capacity of the histogram buffer 20, the controller 41 causes the gate circuit 43 to select only certain pixels from the scanning device 42 which are within the sample window such that only these certain pixels are stored by the histogram buffer 20. The actual selection process is realized by the controller creating a predetermined number of subsample windows within the sample window related to the ratio of the total number of pixels in the sample window to the actual capacity of the histogram buffer.

Once the sample windows are created, the controller 41 generates a random number for each subsample window wherein the random number corresponds to the actual size of the subsample window. Each random number represents a specific pixel within the sample window. This random number, which is fed to the gate circuit 43, instructs the gate circuit 43 as to which pixel within the subsample window is to be stored by the histogram buffer 20. Examples of this process are illustrated in FIGS. 24 and 25.

Figure 24:
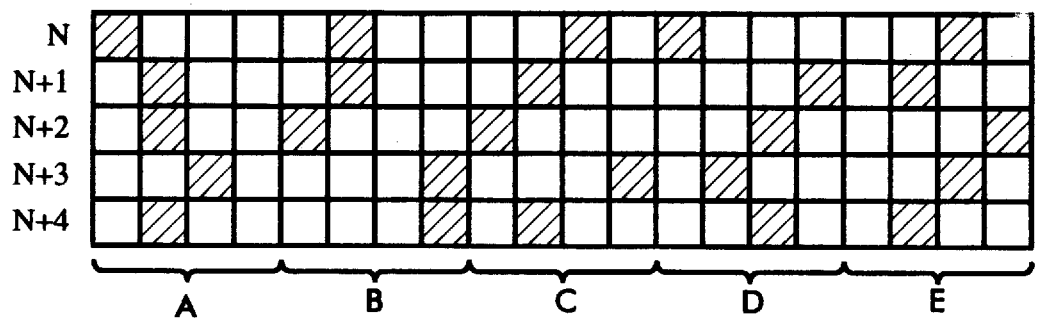
FIG. 24 is a graphical representation of pixels being sampled for a histogram wherein only 25 percent of the scanned image is sampled.
Figure 25:
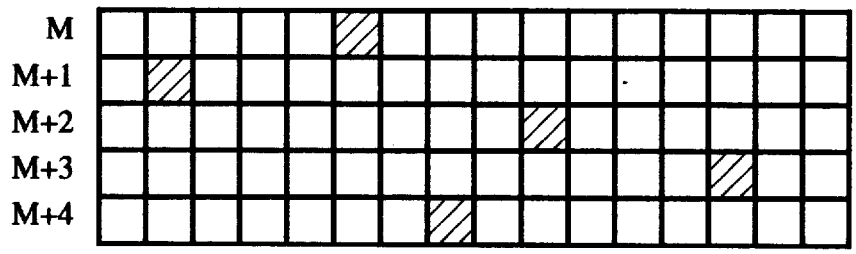
FIG. 25 is a graphical representation of the pixels being sampled for a histogram wherein 6.125 percent of the pixels of the scanned in image are sampled.

FIG. 24 illustrates a situation where the number of pixels in the sample window exceeds the capacity of the histogram buffer such that the controller 41 determines that only ¼ of the pixels within the original sample window are passed on by the gate circuit 43 to the histogram buffer 20. To determine which pixels are passed to the histogram buffer 20, the controller 41 generates a number of subsample windows within the sample window wherein each subsample window has an area corresponding to 4 pixels. Thereafter, the controller 41 generates a random number corresponding to the size of the subsample window.

In the example illustrated in FIG. 24, the random number would be between 1 and 4 wherein each random number corresponds to a particular pixel within the subsample window. This random number is conveyed to the gate circuit 43 such that when the gate circuit 43 receives the pixel from scanning device 42 that corresponds to the random number, the image data associated with the pixel is passed on to the histogram buffer 20. Each darkened pixel illustrated in FIG. 24 represents the pixel within the subsample window selected by gate circuit 43 according to the random number generated by controller 41.

Figure 4:
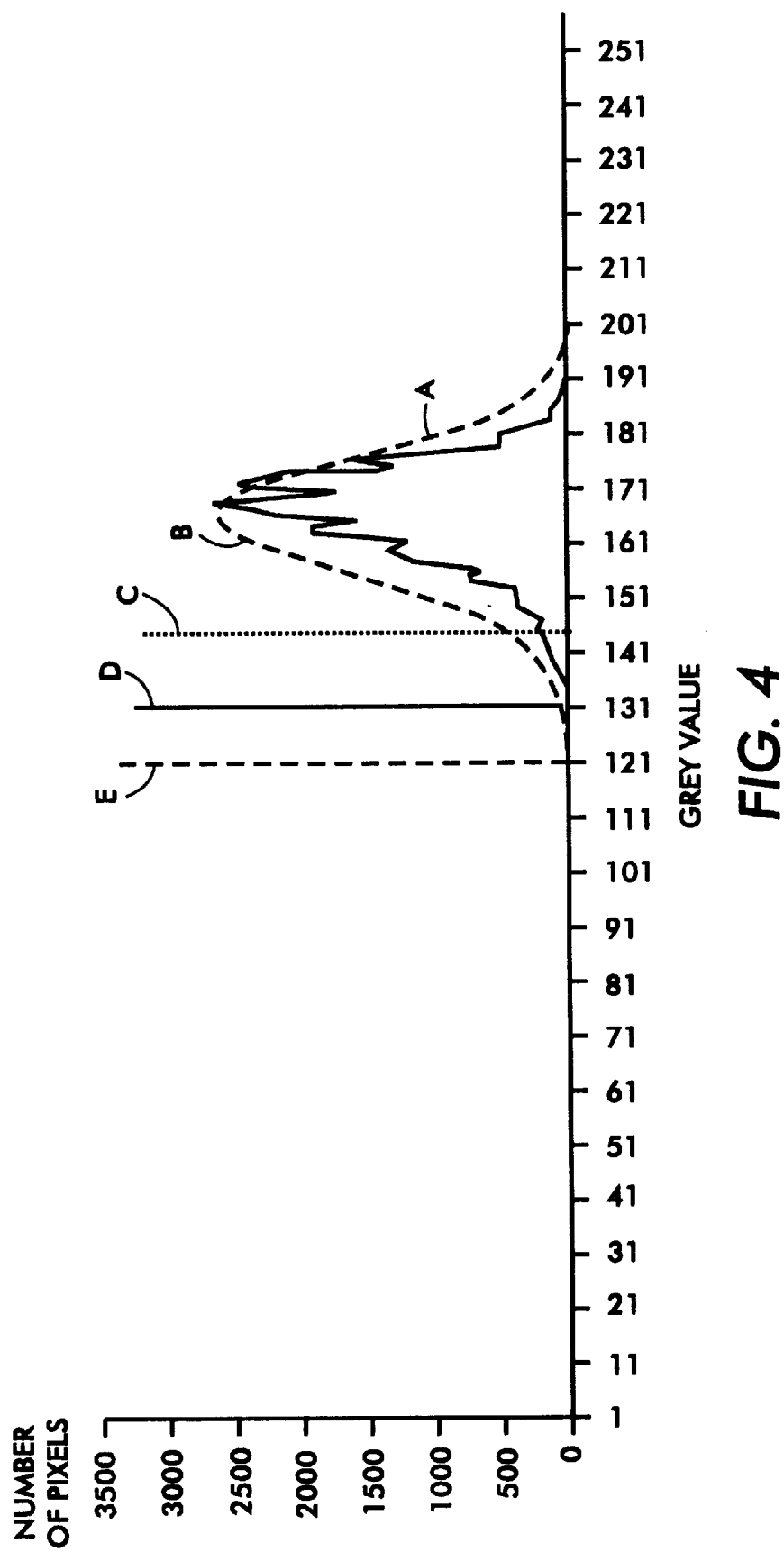
FIG. 4 is a graphical representation illustrating a histogram distribution with many spikes.

In preferred embodiment of the present invention, as illustrated in FIG. 4, the subsample window has a width of only a single scanline. In other words, as illustrated in FIG. 24, the subsample window has a 4×1 pixel to scanline dimension; however, the subsample window could also have a 2×2 pixel to scanline dimension.

Furthermore, as illustrated in FIG. 24, in the subsample window A for scanline N, the controller 41 generates a random number equal to 1 such that the first pixel in the subsample window A is selected by the gate circuit 43 to be passed onto the histogram buffer 20. In the subsample window B for scanline N, the controller 41 generates a random number equal to 2 such that the second pixel within the subsample window B is passed onto histogram buffer 20. Additionally, in the subsample window C illustrated in FIG. 24 for scanline N+3, the controller 41 has generates a random number equal to 4 such that the fourth pixel within the subsample window C is passed on by the gate circuit 43 to the histogram buffer 20. Lastly, for the subsample D window illustrated in FIG. 24 for the scanline N+4, the controller 41 has generated a random number equal to 3 such that the third pixel within the subsample window D is passed on by gate circuit 43 to histogram buffer 20.

Once the histogram data is compiled for a sample window, the bin values, each bin values is associated with a particular grey level value (in the preferred embodiment, the bin values range from 0 to 255 for an eight bit system), for the histogram are read initially from the high intensity (white) spectrum to the low intensity (black) area of the spectrum. The number of pixels at each level (the frequency) is compared to a running stored maximum. The running stored maximum is updated until the slope of the background distribution in the histogram changes from a negative-slope to a positive-slope.

To determine this change in slope, the present invention examines the five neighboring histogram bin values on the positive-slope side of the stored maximum and the three neighboring histogram values on the negative-slope side of the stored maximum. If all eight neighboring bins have values lower than the stored maximum, the present invention declares the present bin value as the background peak for the image, the present bin as having the peak frequency. To accommodate for the possibility of adjacent bins having equal values, the neighborhood test can be modified such that the neighboring bins on either side of the suspected peak may also be allowed to be equal to the peak value in order to satisfy the test.

Moreover, to prevent a false positive with respect to peak identification, the bin value for this peak location is also compared to a threshold value. If the bin value for the peak location is greater than a threshold value, the peak value is allowed to be declared the background peak of the image. The threshold value may be any value determined by the user or can be predetermined in designing the system For example, the threshold value may be about 1% of the total sample size when working with black and white images, or the threshold value may be the total sample size divided by 255 when working with colored images wherein the pixels are represented by 8-bits of image data.

To prevent mis-identification of a minor peak as background, once a peak has been found in the background distribution of the histogram, the present invention continues the search of the histogram data to look for an adjacent larger peak utilizing the same neighbor test described above. If a larger peak is found, and the present invention has not yet identified a valley location (the actual determination of the valley location will be described in more detail below), the present invention designates this new larger peak as the background peak.

Once a background or white peak has been found, the present invention sets a status flag, and the histogram address is reset to 255. The status flag corresponding to the finding of the white peak remains set until the start of a new page or a new sample window begins if the present invention is utilized in the above described ping-pong mode. If the present invention has reached the histogram address corresponding to 0, and a white peak has not been found, the present invention aborts the histogram process and assigns a default value to the background value.

The histogram is then read for a second time to find the quarter (¼) peak location. To find the ¼ peak value, the histogram address is reset to 255 and when the previously found white peak location is reached, subsequent histogram bin values are compared with this maximum peak value (peak frequency value) until a grey level is found which has a frequency value less than or equal to ¼ of the frequency value associated with the white peak location. Since, as discussed above, the typical histogram distribution closely resembles a normal Gaussian distribution, the determination of the quarter (¼) peak value represents a reasonable estimate of the two sigma points from the mean (peak) in the histogram. In other words, the grey level having a frequency less than or equal to ¼ the peak frequency represents a point that is 2 standard deviations away from the mean or peak point in the histogram distribution.

To ensure that the present invention has found the quarter (¼) peak frequency location, the present invention verifies that the three subsequent bin values have values less than or equal to the frequency value at the quarter (¼) peak location. Moreover, the present invention determines whether the difference between the quarter (¼) peak location and the white peak location is less than a threshold which may be programmable by the user. If the quarter (¼) peak location passes these two additional tests, the image background value can be determined from the peak frequency of the quarter (¼) peak location utilizing one of the formulas discussed below.

If the quarter (¼) peak frequency location cannot be determined because the background peak in the histogram is not dominant or there is another dominant mode in the histogram adjacent to the background mode, the present invention tries to find the grey level value which is one standard deviation away from the mean or peak value of the histogram To find this grey level or peak location, the present invention also scans the histogram data to find the closest grey level which has a peak frequency equal to ⅝ of the peak frequency of the white peak.

It is noted that the difference in the number of grey levels between the white peak value and the grey level associated with ⅝ of the peak frequency value corresponds to the number of grey levels between the grey level associated with the ⅝ peak frequency and the grey level associated with the quarter (¼) peak frequency. Thus, the present invention determines an estimate for the quarter (¼) peak frequency location by utilizing the formula (2×⅝peak)−peak. In other words, the present invention subtracts the grey level associated with the white peak from 2 times the grey level value associated with the ⅝ peak value. The results of this formula are used as an estimated grey level value for the ¼ peak frequency of the histogram distribution. The present invention also further verifies the validity of the ⅝ peak value by verifying whether the 3 subsequent histogram bin values have frequency values less than or equal to the frequency value associated with this grey level.

As noted above, there may be situations where the quarter (¼) peak value cannot be found by scanning the histogram data. This is also true with respect to the ⅝ peak frequency value. In the situation where neither the quarter (¼) peak frequency value or the ⅝ peak frequency value can be found, the quarter (¼) peak frequency value can be estimated by calculating the difference between the peak frequency and the quarter (¼) peak frequency value on the negative-slope side of the background distribution curve.

This negative-slope side (¼) quarter (¼) peak frequency value is determined in the same manner as the positive-slope side quarter (¼) peak frequency value except for when the histogram is scanned in this process, the histogram is scanned from the higher values to the lower values up until the white peak location value has been reached. The quarter (¼) peak frequency value is estimated from the negative-slope side quarter (¼) peak frequency value utilizing the following formula: (2 * peak)–¼ negative peak. In other words, the estimated quarter (¼) peak frequency value is the difference between the grey level value associated with the negative-slope side quarter (¼) peak frequency value and twice the grey level value of the white peak location. It is noted that the process for determining the quarter (¼) peak frequency value on the negative-slope side of the background distribution curve utilizes the same circuitry as that used to determine the quarter (¼) peak frequency value on the positive-slope side of the background distribution curve.

In addition to finding the quarter (¼) peak frequency value, the present invention also finds the minimum or valley between the background peak location and an adjacent peak location (most commonly, the black distribution peak). Two potential problems necessitate the looking for a valley in the histogram which separates the background distribution from the rest of the image.

First of all, the present invention needs to know when to stop looking for the quarter (¼), or alternatively, the ⅝ peak frequency value. Secondly, there is often a dominant mode in the histogram next to the background distribution mode. If the background mode is not dominant or the quarter (¼) peak frequency location had to be estimated from either the ⅝ peak frequency value or the quarter (¼) peak frequency value on the negative-slope side of the background distribution curve, it is possible for the estimated quarter (¼) peak location to be lower than the valley between the two distribution modes. In such a situation, the background value would be located on the slope of the adjacent mode, thus adversely effecting the quality of the image when reproduced.

To determine a valley location, the present invention utilizes the same method of looking at neighboring bin values as when locating the white peak value. However, in this situation, the present invention looks for a minimum instead of a maximum. Since the present invention utilizes the same method, the same hardware may be shared when determining the peak or the value.

In the preferred embodiment of the present invention, once the white peak value has been found, the present invention starts looking for the valley location. When the valley location has been found, a flag is set indicating that the valley location has been determined. To ensure that a proper valley location has been determined, the present invention also verifies that the valley location is at least a predetermined number of grey levels beyond the white peak location. If this valley location is not at least a predetermined number of grey levels beyond the white peak location, the present invention keeps looking for a valley until a valley value is found that meets this threshold test. This additional threshold test enables the present invention to accommodate most background distributions which are very spiky.

The peak values for the black distribution curve are determined in a similar manner. Once the background peak values are created, the bin values, each bin values is associated with a particular grey level value for the histogram are read initially from the low intensity (black) spectrum to the high intensity (white) area of the spectrum. The number of pixels at each level (the frequency) is compared to a running stored maximum. The running stored maximum is updated until the slope of the background distribution in the histogram changes from a positive-slope to a negative-slope.

To determine this change in slope, the present invention examines the five neighboring histogram bin values on the negative-slope side of the stored maximum and the three neighboring histogram values on the positive-slope side of the stored maximum. If all eight neighboring bins have values lower than the stored maximum, the present invention declares the present bin value as the black peak for the image, the present bin as having the peak frequency. To accommodate for the possibility of adjacent bins having equal values, the neighborhood test can be modified such that the neighboring bins on either side of the suspected peak may also be allowed to be equal to the peak value in order to satisfy the test.

Moreover, to prevent a false positive with respect to peak identification, the bin value for this peak location is also compared to a threshold value. If the bin value for the peak location is greater than a threshold value, the peak value is allowed to be declared the black peak of the image. The threshold value may be any value determined by the user or can be predetermined in designing the system. For example, the threshold value may be about 1% of the total sample size when working with black and white images, or the threshold value may be the total sample size divided by 255 when working with colored images wherein the pixels are represented by 8-bits of image data.

To prevent mis-identification of a minor peak as a black peak, once a peak has been found in the black distribution of the histogram, the present invention continues the search of the histogram data to look for an adjacent larger peak utilizing the same neighbor test described above. If a larger peak is found, the present invention designates this new larger peak as the black peak.

Once a black peak has been found, the present invention sets a status flag, and the histogram address is reset to 0. The status flag corresponding to the finding of the black peak remains set until the start of a new page or a new sample window begins if the present invention is utilized in the above described ping-pong mode. If the present invention has reached the histogram address corresponding to 255, and a black peak has not been found, the present invention aborts the histogram process and assigns a default value to the black threshold value.

The histogram is then read for a second time to find the quarter (¼) peak location. To find the ¼ peak value, the histogram address is reset to 0 and when the previously found black peak location is reached, subsequent histogram bin values are compared with this maximum peak value (peak frequency value) until a grey level is found which has a frequency value less than or equal to ¼ of the frequency value associated with the black peak location. Since, as discussed above, the typical histogram distribution closely resembles a normal Gaussian distribution, the determination of the quarter (¼) peak value represents a reasonable estimate of the two sigma points from the mean (peak) in the histogram. In other words, the grey level having a frequency less than or equal to ¼ the peak frequency represents a point that is 2 standard deviations away from the mean or peak point in the histogram distribution.

To ensure that the present invention has found the quarter (¼) peak frequency location, the present invention verifies that the three subsequent bin values have values less than or equal to the frequency value at the quarter (¼) peak location. Moreover, the present invention determines whether the difference between the quarter (¼) peak location and the black peak location is less than a threshold which may be programmable by the user. If the quarter (¼) peak location passes these two additional tests, the image black value can be determined from the peak frequency of the quarter (¼) peak location utilizing one of the formulas discussed below.

If the quarter (¼) peak frequency location cannot be determined because the black peak in the histogram is not dominant or there is another dominant mode in the histogram adjacent to the black mode, the present invention tries to find the grey level value which is one standard deviation away from the mean or peak value of the histogram. To find this grey level or peak location, the present invention also scans the histogram data to find the closest grey level which has a peak frequency equal to ⅝ of the peak frequency of the black peak.

It is noted that the difference in the number of grey levels between the black peak value and the grey level associated with ⅝ of the peak frequency value corresponds to the number of grey levels between the grey level associated with the ⅝ peak frequency and the grey level associated with the quarter (¼) peak frequency. Thus, the present invention determines an estimate for the quarter (¼) peak frequency location by utilizing the formula (2×⅝ peak)−peak. In other words, the present invention subtracts the grey level associated with the white peak from 2 times the grey level value associated with the ⅝ peak value. The results of this formula are used as an estimated grey level value for the ¼ peak frequency of the histogram distribution. The present invention also further verifies the validity of the ⅝ peak value by verifying whether the 3 subsequent histogram bin values have frequency values less than or equal to the frequency value associated with this grey level.

As noted above, there may be situations where the quarter (¼) peak value cannot be found by scanning the histogram data. This is also true with respect to the ⅝ peak frequency value. In the situation where neither the quarter (¼) peak frequency value or the ⅝ peak frequency value can be found, the quarter (¼) peak frequency value can be estimated by calculating the difference between the peak frequency and the quarter (¼) peak frequency value on the positive-slope side of the black distribution curve.

This positive-slope side quarter (¼) peak frequency value is determined in the same manner as the quarter (¼) peak frequency value except for when the histogram is scanned in this process, the histogram is scanned from the lower values to the higher values up until the black peak location value has been reached. The quarter (¼) peak frequency value is estimated from the positive-slope side quarter (¼) peak frequency value utilizing the following formula: (2 * peak) −¼ positive peak.

In other words, the estimated quarter (¼) peak frequency value is the difference between the grey level value associated with the positive-slope side quarter (¼) peak frequency value and twice the grey level value of the black peak location. It is noted that the process for determining the quarter (¼) peak frequency value on the positive-slope side of the black distribution curve utilizes the same circuitry as that used to determine the quarter (¼) peak frequency value on the negative-slope side of the background distribution curve.

FIGS. 9 through 12 illustrate flowcharts showing a process carried out by the present invention to determine the various peak values with respect to finding the background or white threshold value and the black threshold value.

Figure 9:
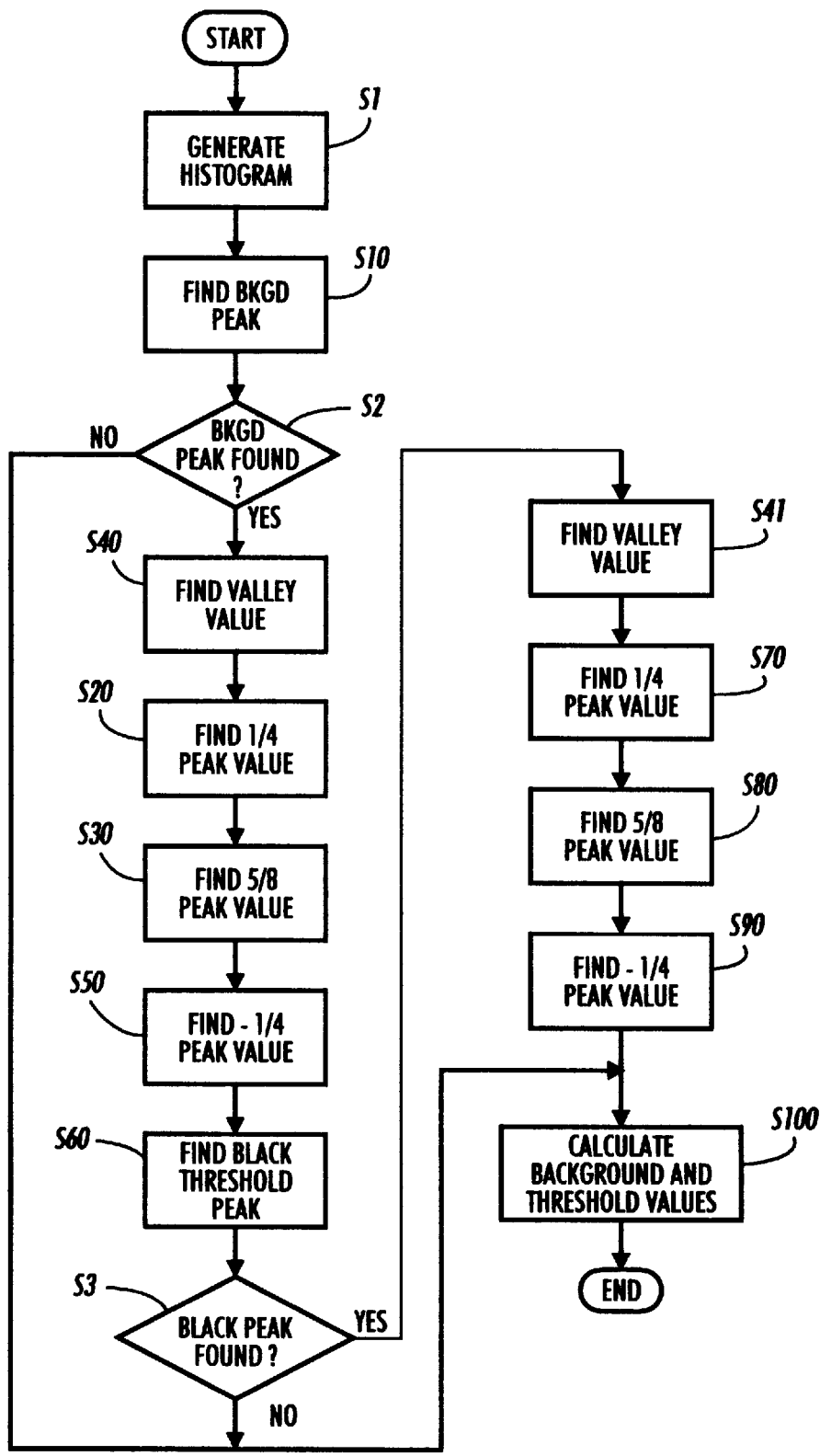
FIG. 9 is a flowchart illustrating an overall process for calculating the background value and black threshold value for a scanned image.

With respect to FIG. 9, FIG. 9 illustrates a simple flowchart showing the process carried out by the present invention in order to determine both the peak values for the background value determination and the peak values for the black threshold value determination. In this process, a histogram of the image to be processed, from either scanning the entire image or a sample window of the image, is generated at step S1. After the histogram is generated, the process scans the histogram data from the highest grey level to the lowest grey level to determine the background peak at step S10.

At step S2, the process determines whether a background peak value has been found. If a background peak value has been found, step S40 determines the valley value for the histogram data. Step S20 causes the histogram data to be rescanned so that the quarter (¼) peak value can be determined. Next, during this rescanning of the histogram data, step S30 determines the ⅝ frequency peak value. In a third scan of the histogram data, step S50 looks at the negative-slope of the background distribution curve to find the quarter (¼) peak value associated with the negative-slope side. Thereafter, step S60 causes the histogram data to be scanned from the lower grey level values to be higher grey level values so as to find the black peak value.

Step S3 determines whether the black threshold peak value has been found. If the black peak frequency value has been found, step S41 determines the valley value for the histogram data. Step S70 determines the quarter (¼) peak frequency value with respect to black peak frequency values. Thereafter, steps S80 and S90 find the ⅝ peak frequency value and the quarter (¼) peak frequency value on the positive-slope side, respectively. After going through these various process steps, the present invention, at step S100, calculates the background and black threshold values to be utilized in processing the image data for reproduction.

Figure 10:
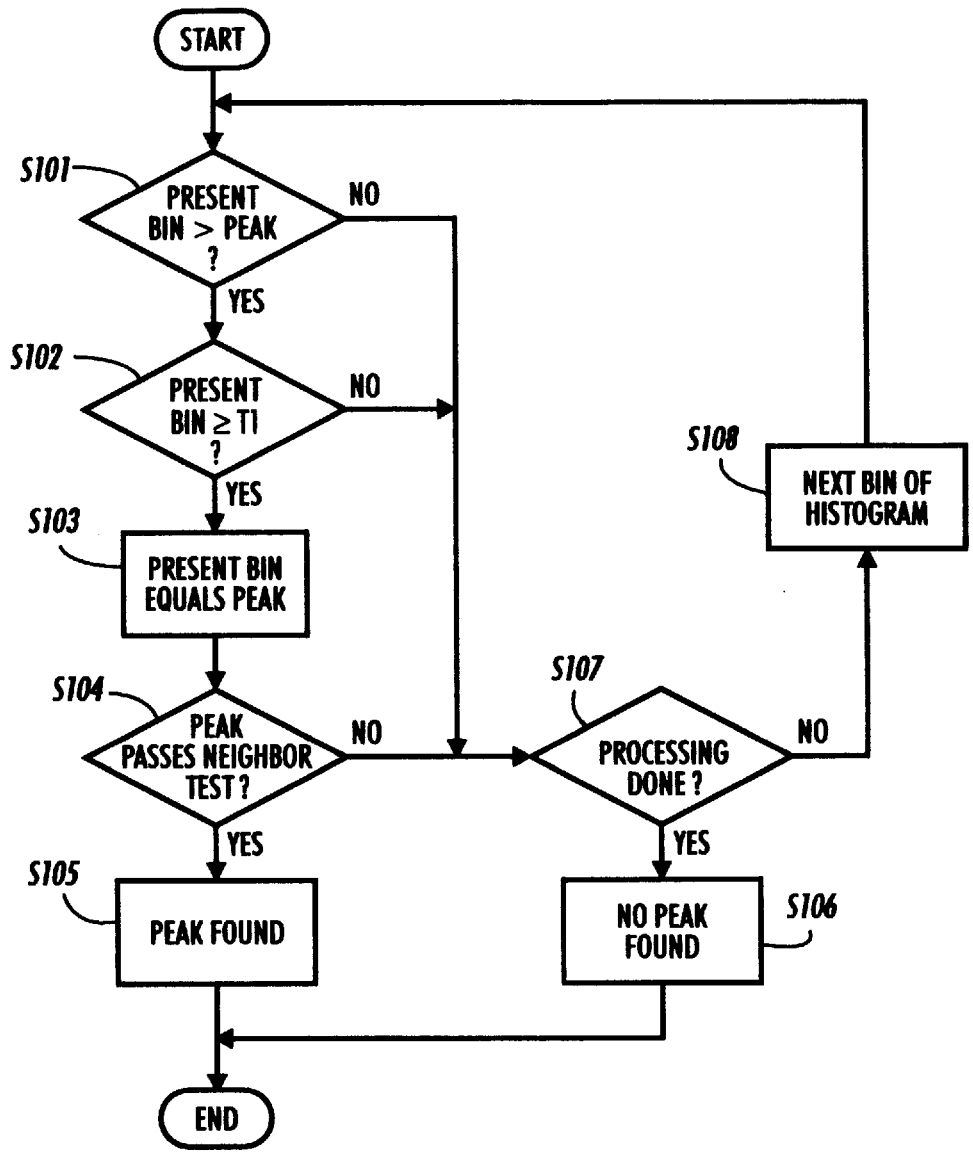
FIG. 10 is a flowchart illustrating the find peak subroutine of FIG. 9 for both the background peak value and the black threshold peak value.

FIG. 10 illustrates the process for determining either the background peak value or the black peak value. In this process, step S101 determines whether the frequency value of the present bin is greater than the frequency value of the running stored maximum. If the frequency value of the present bin is not greater than the running stored peak value, step S107 determines whether the processing of the histogram data has been completed.

If the processing of the histogram data has not been completed, step S108 retrieves the next bin value of the histogram in the process and returns to step S101. On the other hand, if step S107 determines that the processing of the histogram data is completed, step S106 sets a flag indicating that no peak value has been found.

If the frequency value of the present bin is greater than the running stored maximum frequency value, step S102 determines whether the present bin value is greater than a predetermined first threshold value. If the present bin value is greater than the predetermined first threshold value, step S103 stores the frequency value of the present bin as the new running stored maximum frequency value.

The process then determines, at step S104, whether the frequency value of the present bin passes the neighbor test. If the neighbor test is passed, step S105 sets a flag indicating that the peak value has been found.

Figure 11:
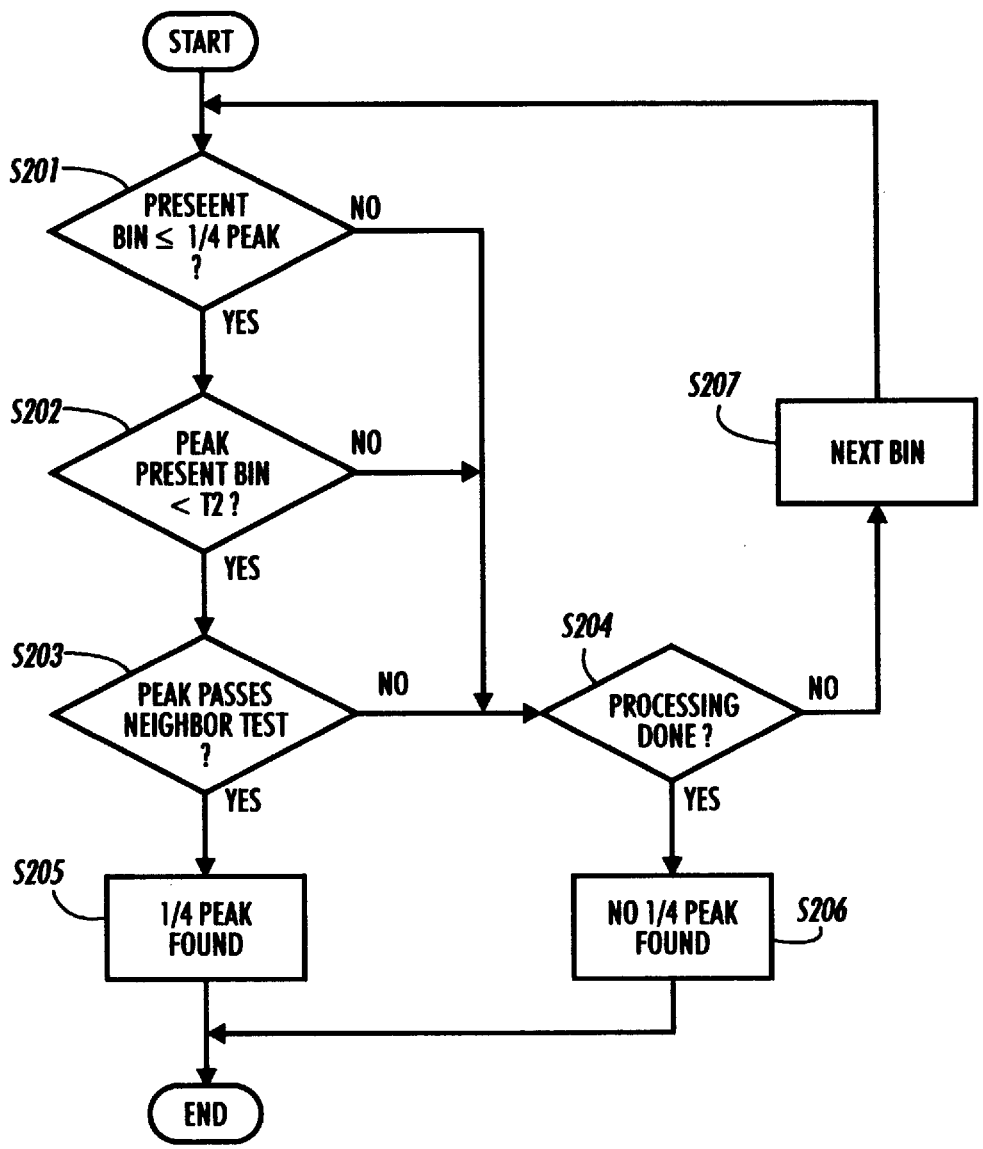
FIG. 11 is flowchart illustrating a subroutine for finding the quarter (¼) peak value for either the background value routine or the black threshold value routine.

FIG. 11 illustrates the process for determining either the ¼ background peak value or the ¼ black peak value. In this process, step S201 determines whether the frequency value of the present bin is less than or equal to ¼ of the frequency value of the peak. If the frequency value of the present bin is not less than or equal to ¼ of the frequency value of the peak, step S204 determines whether the processing of the histogram data has been completed.

If the processing of the histogram data has not been completed, step S207 retrieves the next bin value of the histogram in the process and returns to step S201. On the other hand, if step S204 determines that the processing of the histogram data is completed, step S206 sets a flag indicating that no ¼ peak value has been found.

If the frequency value of the present bin is less than or equal to the ¼ of the frequency value of the peak, step S202 determines whether the difference between the present bin value and the location of the peak value is less than a predetermined second threshold value. If the difference is less than the predetermined second threshold value, step S203 determines whether the frequency value of the present bin passes the neighbor test. If the neighbor test is passed, step S205 sets a flag indicating that the ¼ peak value has been found.

It is noted that the process illustrated in FIG. 11 can also be used to find the negative-slope and positive-slope ¼ peak values for the background and black distributions, respectively.

Figure 12:
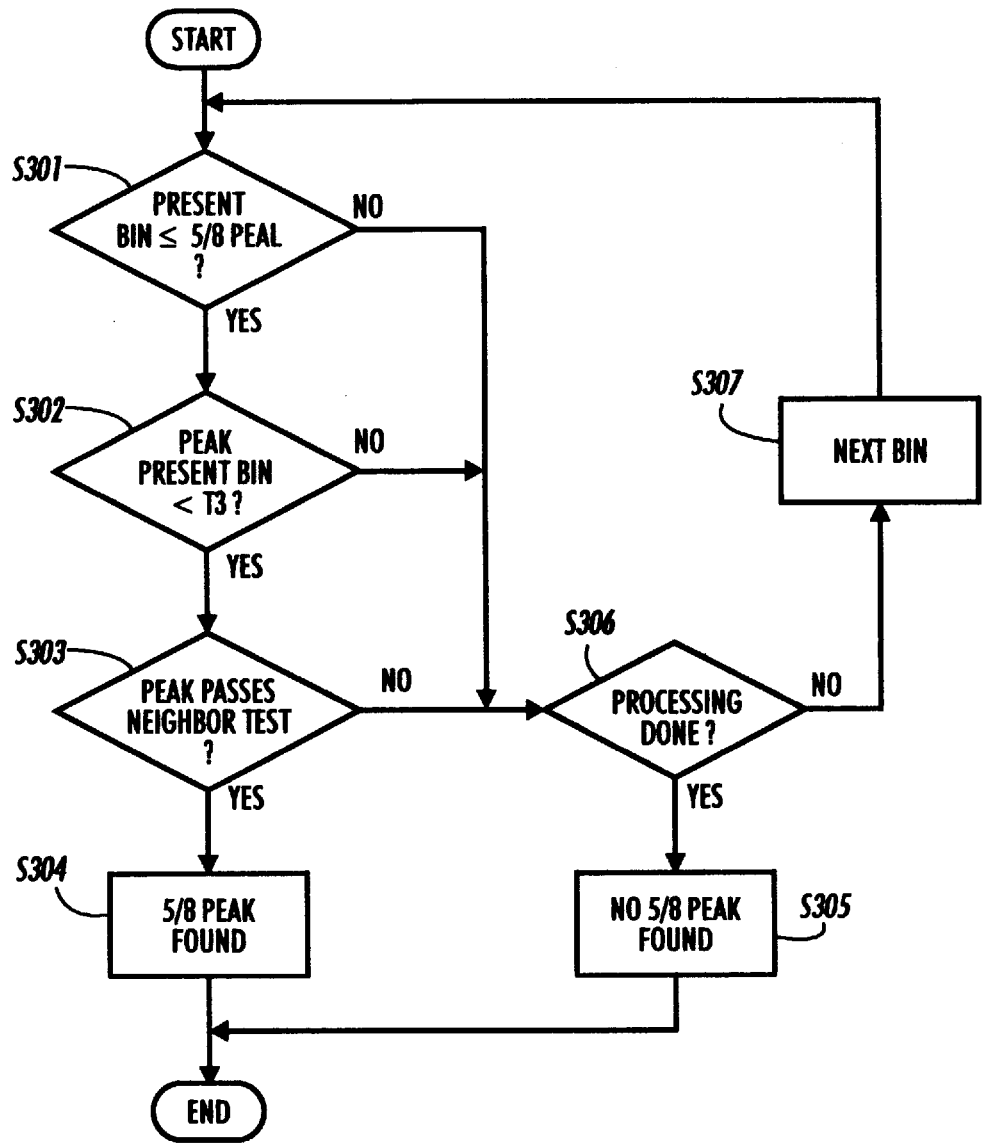
FIG. 12 is a flowchart illustrating a routine for finding the ⅝th peak value for either the background value process or the black threshold value process.

FIG. 12 illustrates the process for determining either the ⅝ background peak value or the ⅝ black peak value. In this process, step S301 determines whether the frequency value of the present bin is less than or equal to ⅝ of the frequency value of the peak. If the frequency value of the present bin is not less than or equal to ⅝ of the frequency value of the peak, step S306 determines whether the processing of the histogram data has been completed.

If the processing of the histogram data has not been completed, step S307 retrieves the next bin value of the histogram in the process and returns to step S301. On the other hand, if step S306 determines that the processing of the histogram data is completed, step S305 sets a flag indicating that no ⅝ peak value has been found.

If the frequency value of the present bin is less than or equal to the ⅝ of the frequency value of the peak, step S302 determines whether the difference between the present bin value and the location of the peak value is less than a predetermined third threshold value. If the difference is less than the predetermined third threshold value, step S303 determines whether the frequency value of the present bin passes the neighbor test. If the neighbor test is passed, step S304 sets a flag indicating that the ⅝ peak value has been found.

Figure 13:
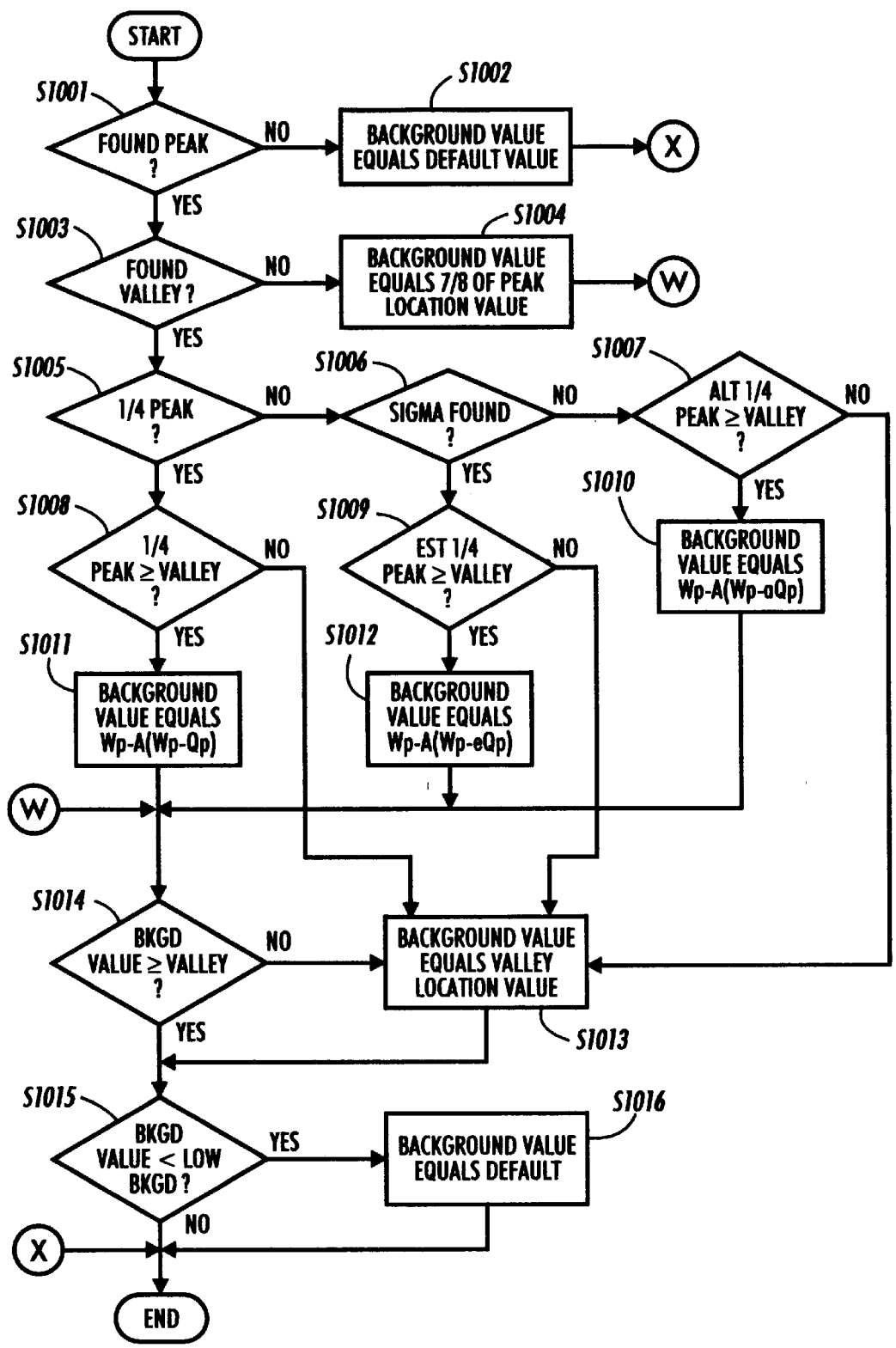
FIG. 13 is a flowchart illustrating the calculation of the background value from the histogram data.

Once the various peak values and valley values have been determined, FIG. 13 provides a process for calculating the actual background value to be utilized in processing the image. In the calculation process, step S1001 determines whether a background peak value has been found. If no background peak value was found, step S1002 sets the background value to be utilized in the image processing operation equal to a default value. On the other hand, if a background peak value has been found, step S1003 determines whether a valley value has been determined. If a valley value has not been found, step S1004 sets the background value for processing equal to ⅞ of the peak location value.

If a valley value has been found, step S1005 determines whether a quarter (¼) peak value was found. If a quarter (¼) peak value was found, step S1008 determines whether a quarter (¼) peak value is greater than or equal to the valley value. If the quarter (¼) peak value is not greater than or equal to the valley value, step S1013 sets the background value for the image processing operation equal to the valley location value. On the other hand, if the quarter (¼) peak value is greater than or equal to the valley value, step S1011 calculates the background value to be equal to the peak value minus a scalar times the difference between the peak value minus the quarter (¼) peak value, Wp–A(Wp–Qp). The scalar A is the value which is programmable by the user to allow the user to choose the background value to be anywhere between 2 and 4 standard deviations from the peak value.

After this background value has been calculated, step S1014 determines whether the calculated background value is greater than or equal to the valley value. If the background value is less than the valley value, step S1013 makes the background value equal to the valley location value. On the other hand, if the background value is greater than or equal to the valley value, step S1015 determines whether the background value is less than a threshold value corresponding to the lowest desirable background value. If the background value is less than the desirable lowest background value, step S1016 sets the background value to be equal to a default value.

If step S1005 determines that a quarter (¼) peak value was not found, step S1006 determines whether a sigma value or the ⅝ peak value was found. If the ⅝ peak value was found, step S1009 determines whether the estimated quarter (¼) peak value associated with the ⅝ peak value is greater than or equal to the valley value. If step S1009 makes a positive determination, step S1012 calculates the process background value to be equal to the white peak value minus a scalar times the difference between the white peak value and the estimated quarter (¼) peak value, Wp–A(Wp–eQp), and the process continues on to step S1014.

On the other hand, if step S1006 determines that the ⅝ peak value was not found, step S1007 determines whether the alternate quarter (¼) peak value, the quarter (¼) peak value associated with the negative-slope side of the distribution, is greater than or equal than the valley value. If step S1007 makes a positive determination, the process background value is calculated to be equal to the white peak value minus a scalar times the difference between the white peak value and the alternate quarter (¼) peak value, Wp–A(Wp–aQp), and the process continues on to step S1014.

Figure 14:
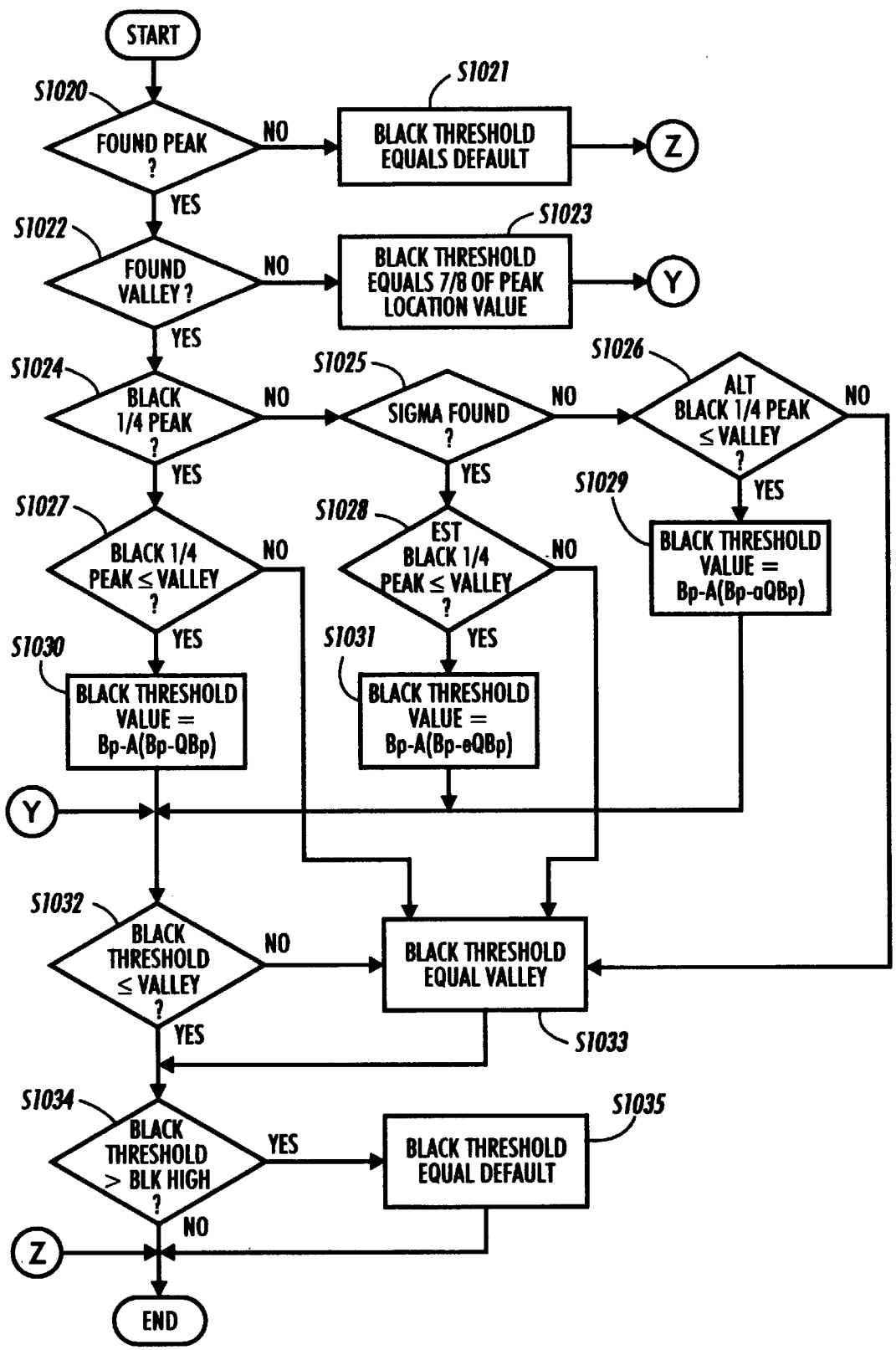
FIG. 14 is a flowchart illustrating the calculation of the black threshold value from the histogram data.

Moreover, once the various peak values and valley values have been determined, FIG. 14 provides a process for calculating the actual black threshold value to be utilized in processing the image. In the calculation process, step S1020 determines whether a black peak value has been found. If no black peak value was found, step S1021 sets the black threshold value to be utilized in the image processing operation equal to a default value. On the other hand, if a black peak value has been found, step S1022 determines whether a valley value has been determined. If a valley value has not been found, step S1023 sets the black threshold value for processing equal to ⅞ of the peak location value.

If a valley value has been found, step S1024 determines whether a quarter (¼) peak value was found. If a quarter (¼) peak value was found, step S1025 determines whether a quarter (¼) peak value is less than or equal to the valley value. If the quarter (¼) peak value is greater than the valley value, step S1033 sets the black threshold value for the image processing operation equal to the valley location value. On the other hand, if the quarter (¼) peak value is less than or equal to the valley value, step S1011 calculates the black threshold value to be equal to the black peak value minus a scalar times the difference between the black peak value minus the quarter (¼) peak value, Bp−A(Bp−QBp). The scalar A is the value which is programmable by the user to allow the user to choose the black threshold value to be anywhere between 2 and 4 standard deviations from the peak value.

After this black threshold value has been calculated, step S1032 determines whether the calculated black threshold value is less than or equal to the valley value. If the black threshold value is greater than the valley value, step S1033 makes the black threshold value equal to the valley location value. On the other hand, if the black threshold value is less than or equal to the valley value, step S1034 determines whether the black threshold value is greater than a threshold value corresponding to the highest desirable black threshold value. If the black threshold value is greater than the desirable lowest black threshold value, step S1035 sets the black threshold value to be equal to a default value.

If step S1024 determines that a quarter (¼) peak value was not found, step S1025 determines whether a sigma value or the ⅝ peak value was found. If the ⅝ peak value was found, step S1028 determines whether the estimated quarter (¼) peak value associated with the ⅝ peak value is less than or equal to the valley value. If step S1028 makes a positive determination, step S1031 calculates the process black threshold value to be equal to the black peak value minus a scalar times the difference between the black peak value and the estimated quarter (¼) peak value, Bp−A(Bp−eQBp), and the process continues on to step S1032.

On the other hand, if step S1025 determines that the ⅝ peak value was not found, step S1026 determines whether the alternate quarter (¼) peak value, the quarter (¼) peak value associated with the positive-slope side of the distribution, is less than or equal than the valley value. If step S1026 makes a positive determination, the process black threshold value is calculated to be equal to the black peak value minus a scalar times the difference between the black peak value and the alternate quarter (¼) peak value, Bp−A(Bp−aQBp), and the process continues on to step S1032.

Figure 21:
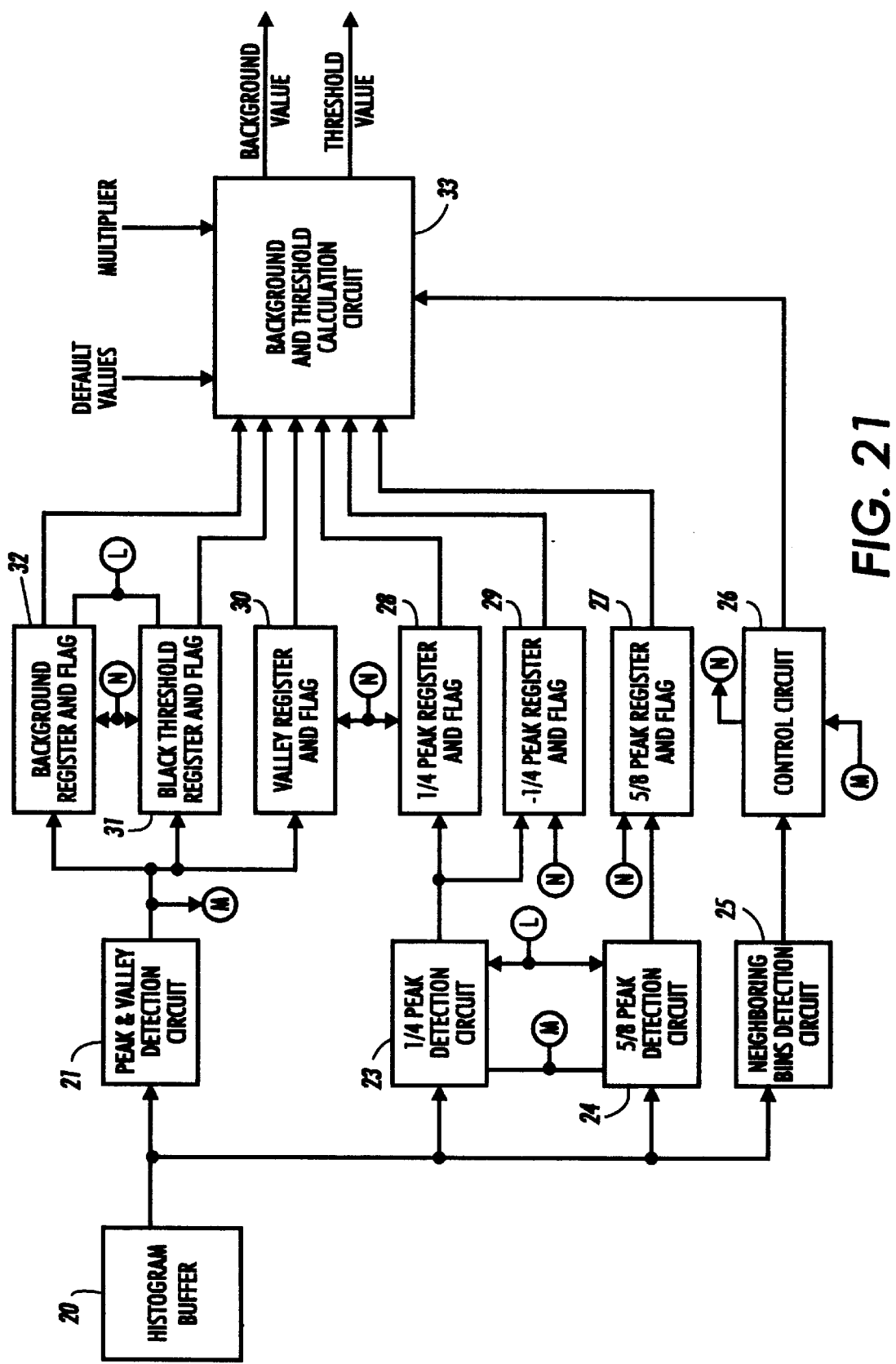
FIG. 21 is a block diagram illustrating a circuit for calculating the background and threshold values from histogram data.

FIG. 21 illustrates a block diagram showing the circuitry utilized by the present invention to determine the background and black threshold values to be utilized when processing the scanned image. As illustrated in FIG. 21, histogram data is stored in a histogram buffer 20. This histogram data is fed to a peak and valley detection circuit 21, a quarter (¼) peak detection circuit 23, a ⅝ peak detection circuit 24, and a neighboring bins detection circuit 25.

Peak and valley detection circuit 21 determines whether the present bin's frequency value is greater than a running stored maximum frequency value. If the peak and valley detection circuit 21 determines that the present bin's frequency value is greater than the running stored maximum frequency value, a signal is sent to a control circuit 26. In parallel with this peak and valley detection circuit's operation, the neighboring bins detection circuit 25 is determining whether the present bin passes the neighboring bins test as described above.

If the present bin passes the neighboring bins test, and the peak and valley detection circuit 21 has detected a peak, the control circuit 26 sends a signal to either the background register and flag circuit 32 or the black threshold register and flag circuit 31 so that these circuits can register either a background value or a black threshold value depending on whether the present process is determining the background value or the black threshold value.

Moreover, if the peak and valley detection circuit 21 determines that the present bin is less than a running stored minimum frequency value and the neighboring bin's detection circuit 25 determines that the present bin passes the neighboring bins valley detection test, the control circuit 26 sends a signal to a valley register and flag circuit 30 so that the present bin value can be registered as the valley value for the histogram.

Quarter peak detection circuit 23 determines whether the present bin's frequency value corresponds to 25% of the peak frequency value. If the quarter peak detection circuit 22 determines that the present bin's frequency value corresponds to 25% of the peak frequency value, a signal is sent to the control circuit 26. In parallel with this quarter peak detection circuit's operation, the neighboring bins detection circuit 25 is determining whether the present bin passes the neighboring bins test as described above.

If the present bin passes the neighboring bins test, and the quarter peak detection circuit 23 has detected a ¼ peak, the control circuit 26 sends a signal to either the ¼ peak register and flag circuit 28 or the −¼ peak register and flag circuit 29 so that these circuits can register either a ¼ peak value depending on which test is being performed.

⅝ peak detection circuit 24 determines whether the present bin's frequency value corresponds to ⅝ of the peak frequency. If the ⅝ peak detection circuit 24 determines that the present bin's frequency value corresponds to ⅝ of the peak frequency, a signal is sent to the control circuit 26. In parallel with this ⅝ peak detection circuit's operation, the neighboring bins detection circuit 25 is determining whether the present bin passes the neighboring bins test as described above.

If the present bin passes the neighboring bins test, and the ⅝ peak detection circuit 24 has detected a ⅝ peak, the control circuit 26 sends a signal to the ⅝ peak register and flag circuit so that this circuit can register the proper value.

Once all the various registers and flag circuits have been loaded and/or set, the control circuit 26 enables a background and black threshold calculation circuit 33 to calculate the background value and black threshold valley to be utilized in processing the image. The background and black threshold calculation circuit 33 also receive predetermined default values for either the background value or black threshold value as well as any scalar values preprogrammed by the user through a user interface.

Figure 22:
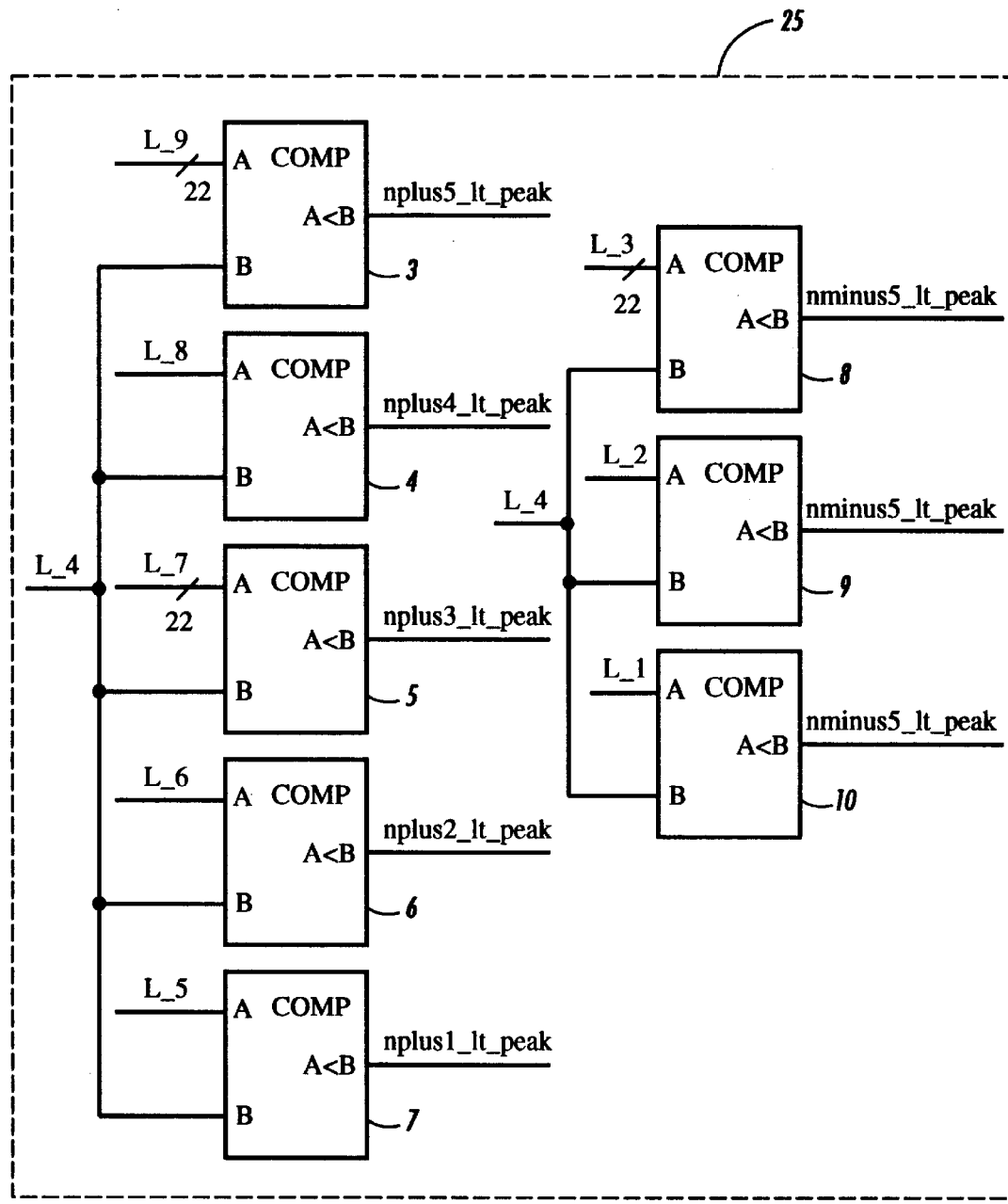
FIG. 22 is a block diagram illustrating the circuitry utilized in the neighboring bins test.
Figure 23:
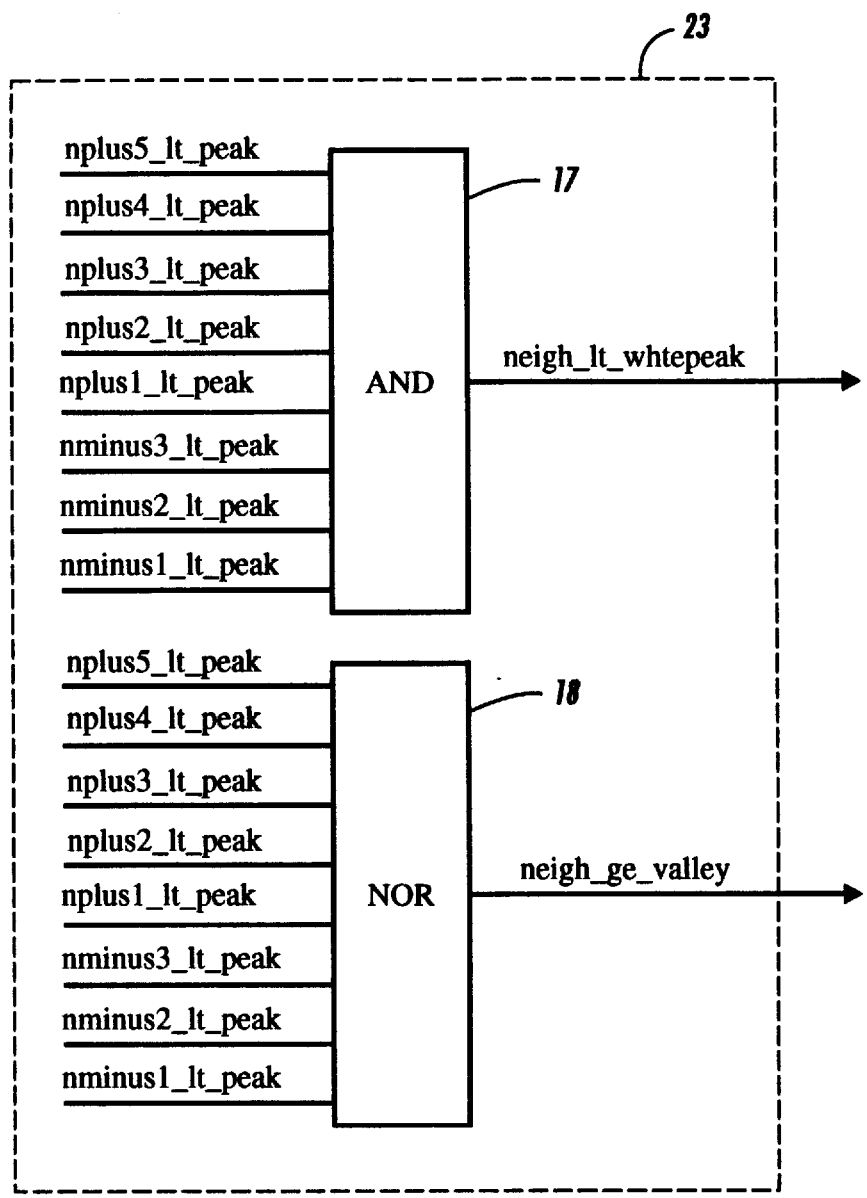
FIG. 23 is a block diagram showing the logic used to perform the neighboring bin test.

FIG. 22 illustrates a comparator circuit utilized in the neighboring bins detection circuit 25 wherein a plurality of comparators (3, 4, 5, 6, 7, 8, 9, and 10) produce signals indicating whether the present bin's value is greater than the neighboring bin values wherein 5 of the neighboring bin values are located on one side of the present bin value and 3 of the neighboring bin values are located on the other side from the present bin value. Once these various comparisons are complete, the comparisons are fed into the neighboring bins test circuits 17 and 18 as illustrated in FIG. 23.

Neighboring bin test circuit 17 determines whether the present bin's value is greater than the neighboring bin values. On the other hand, neighboring bin test circuit 18 determines whether the present bin's value is less than the neighboring bin values. In other words, neighboring bin test circuit 17 determines if the present bin's value is an actual peak value for the histogram, while neighboring bin test circuit 18 determines whether the present bin's value is an actual valley value for the histogram.

Examples of actual histograms analyzed utilizing the concepts of the present invention are illustrated in FIGS. 3–8.

Figure 3:
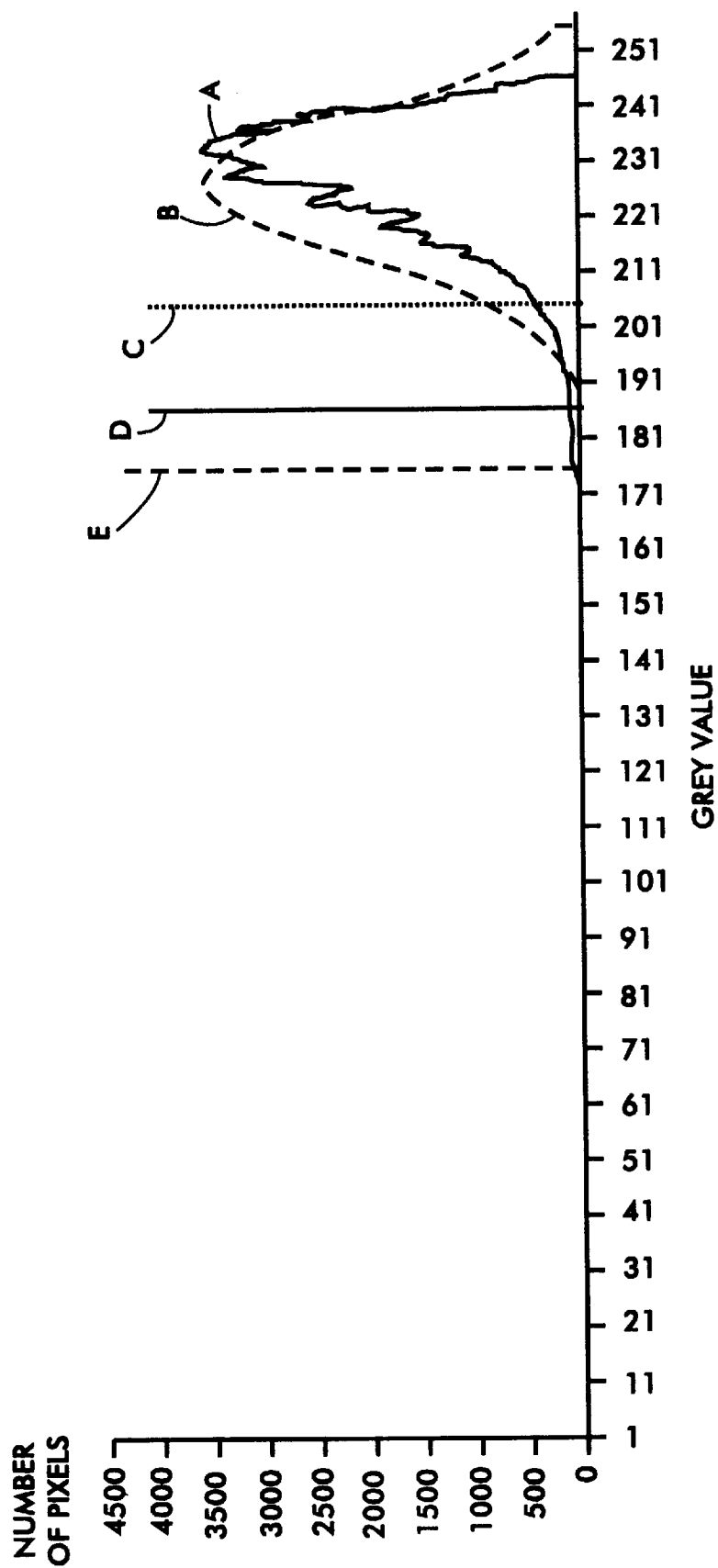
FIG. 3 is a graphical representation of a negatively skewed background distribution.

As noted above, FIG. 3 illustrates an example of a negatively skewed background distribution. This graphical representation illustrates the present invention's relative insensitivity to non-Gaussian distributions. As illustrated in FIG. 3, the histogram data is represented by line A, while a true histogram Gaussian approximation is represented by line B. Utilizing the concepts and processes of the present invention, the background peak value for the histogram illustrated in FIG. 3 was determined to be grey level 231. Moreover, when scanning the same image utilizing a sample window of the image, the peak grey value was also determined to be 231 by the present invention. Furthermore, as illustrated in FIG. 3, line C represents the four sigma point of the histogram from the sample window, while line D represents the four sigma point of the histogram distribution wherein the histogram is of the entire scanned image. Lastly, line E represents the four sigma point of the Gaussian approximation.

FIG. 4 illustrates an example of a histogram of an image which has created many spikes in the distribution. This Figure illustrates that the present invention did not identify any false peaks or valleys even though the distribution had many spikes.

As illustrated in FIG. 4, the histogram data is represented by line A, while a true histogram Gaussian approximation is represented by line B. Utilizing the concepts and processes of the present invention, the background peak value for the histogram illustrated in FIG. 4 was determined to be grey level 166. Moreover, when scanning the same image utilizing a sample window of the image, the peak grey value was also determined to be 166 by the present invention. Furthermore, as illustrated in FIG. 4, line C represents the four sigma point of the histogram from the sample window, while line D represents the four sigma point of the histogram distribution wherein the histogram is of the entire scanned image. Lastly, line E represents the four sigma point of the Gaussian approximation.

Figure 5:
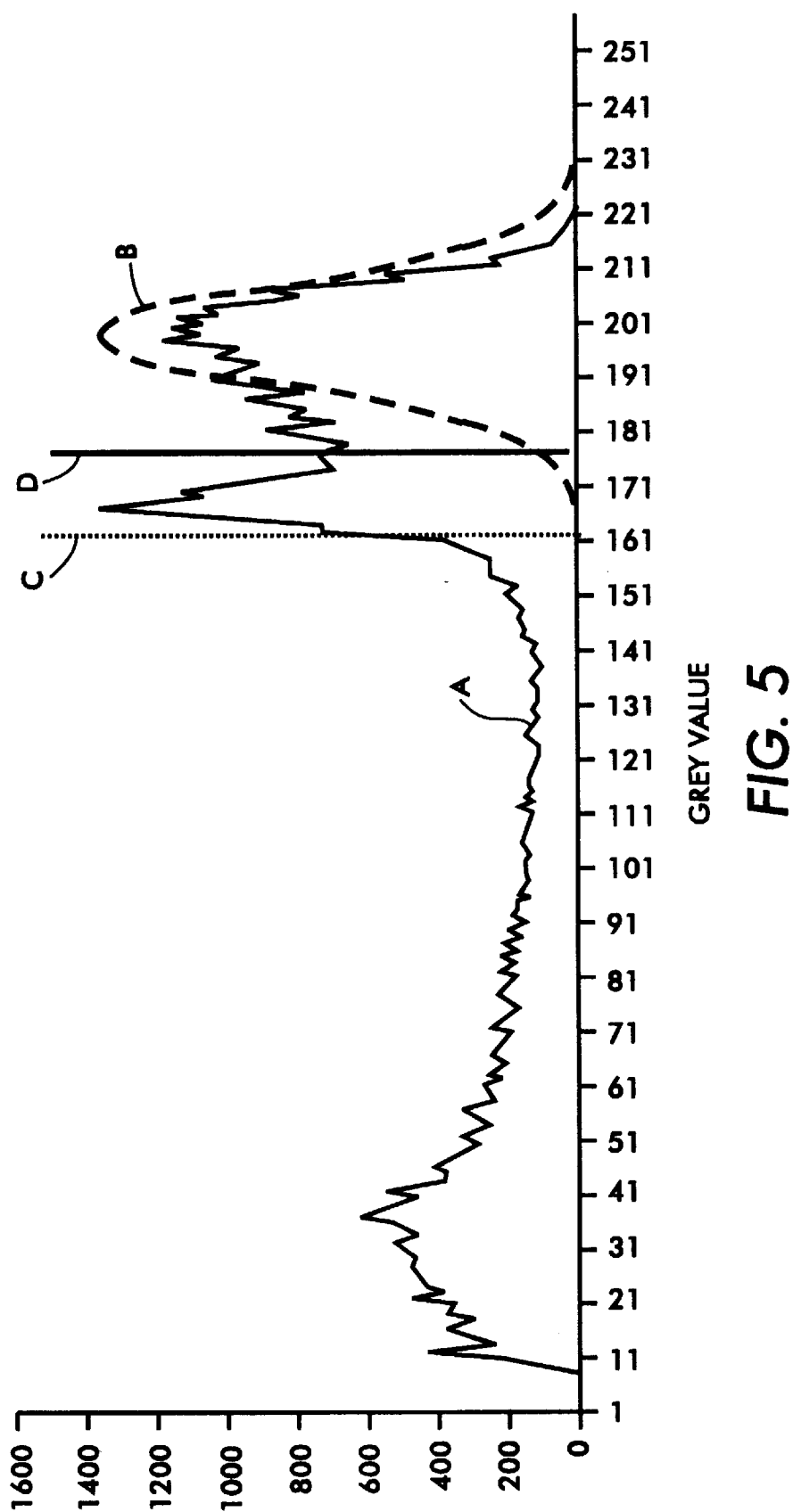
FIG. 5 is a graphical representation illustrating a histogram where the background value is less than an adjacent valley.

FIG. 5 is an example of a histogram where the background value is less than an adjacent valley. In such a situation, the background value is set equal to the valley value. In other words, the background value was set equal to line D. As illustrated in FIG. 5, the histogram data is represented by line A, while a true histogram Gaussian approximation is represented by line B. Utilizing the concepts and processes of the present invention, the background peak value for the histogram illustrated in FIG. 5 was determined to be grey level 199. Moreover, when scanning the same image utilizing a sample window of the image, the peak grey value was also determined to be 200 by the present invention. Furthermore, as illustrated in FIG. 5, line C represents the four sigma point of the histogram from the sample window, while line D represents the four sigma point of the histogram distribution wherein the histogram is of the entire scanned image.

Figure 6:
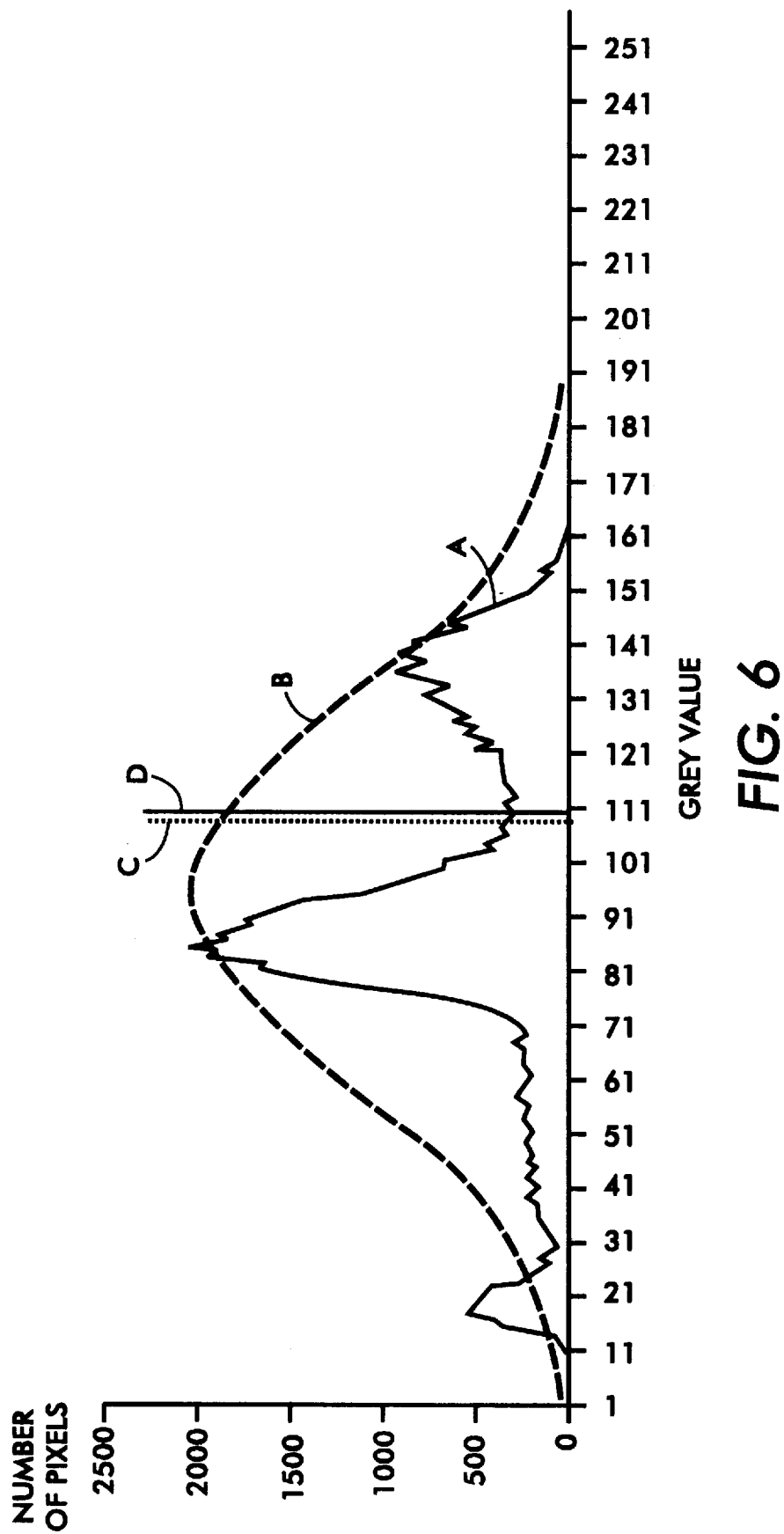
FIG. 6 is a graphical representation illustrating a histogram where the background value has to be estimated.

FIG. 6 illustrates an example of a histogram where the background value had to be estimated from the 5/8 peak value. As illustrated in FIG. 6, the histogram data is represented by line A, while a true histogram Gaussian approximation is represented by line B. Utilizing the concepts and processes of the present invention, the background peak value for the histogram illustrated in FIG. 6 was determined to be grey level 137. Moreover, when scanning the same image utilizing a sample window of the image, the peak grey value was also determined to be 136 by the present invention. Furthermore, as illustrated in FIG. 6, line C represents the four sigma point of the histogram from the sample window, while line D represents the four sigma point of the histogram distribution wherein the histogram is of the entire scanned image.

Figure 7:
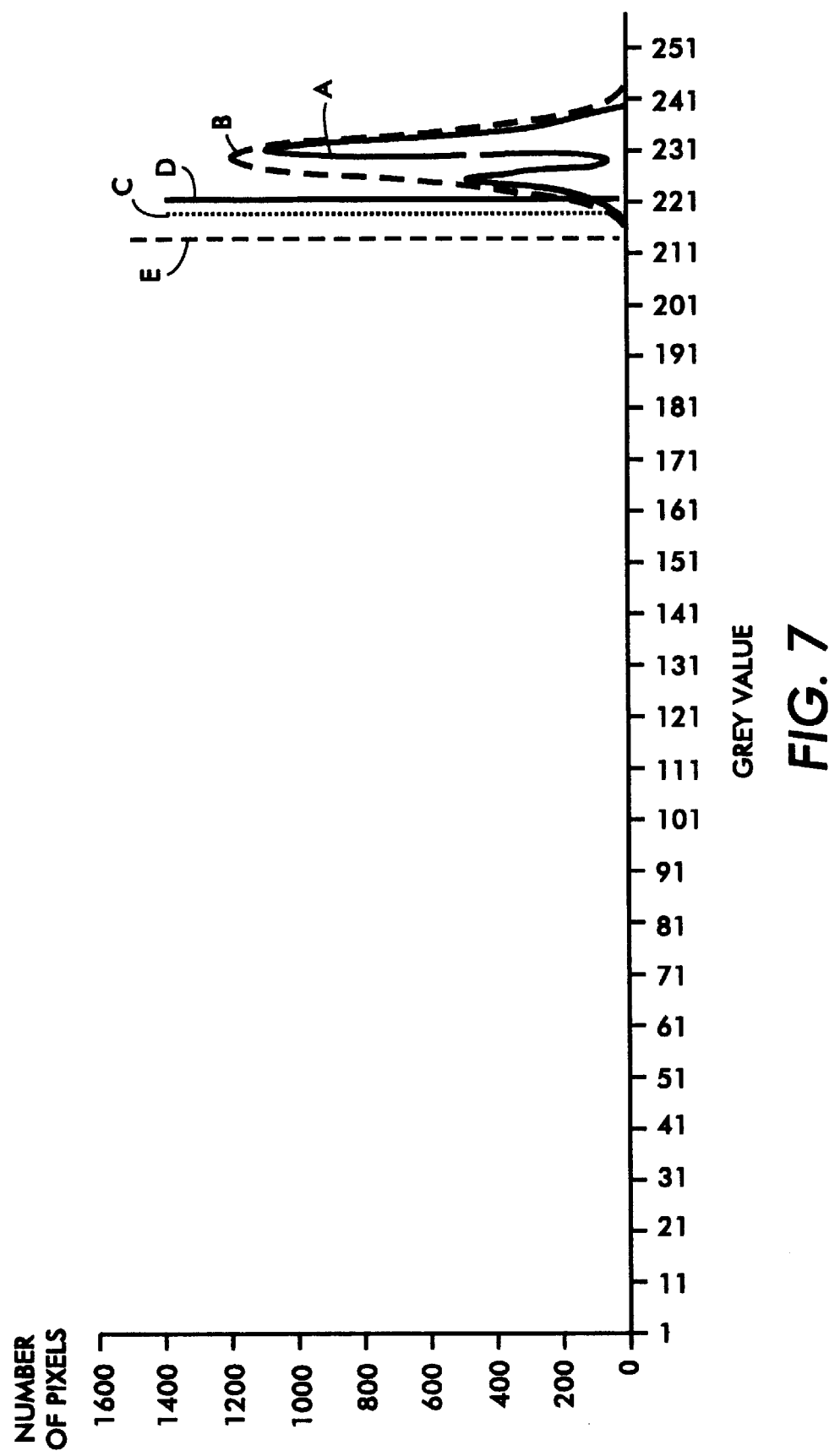
FIG. 7 is a graphical representation illustrating a histogram where no adjacent valley is found.

FIG. 7 illustrates an example of a histogram where no adjacent valley was found so the background value was estimated from 7/8 of the white peak value. As illustrated in FIG. 7, the histogram data is represented by line A, while a true histogram Gaussian approximation is represented by line B. Utilizing the concepts and processes of the present invention, the background peak value for the histogram illustrated in FIG. 7 was determined to be grey level 233. Moreover, when scanning the same image utilizing a sample window of the image, the peak grey value was also determined to be 233 by the present invention. Furthermore, as illustrated in FIG. 7, line C represents the four sigma point of the histogram from the sample window, while line D represents the four sigma point of the histogram distribution wherein the histogram is of the entire scanned image. Lastly, line E represents the four sigma point of the Gaussian approximation.

Figure 8:
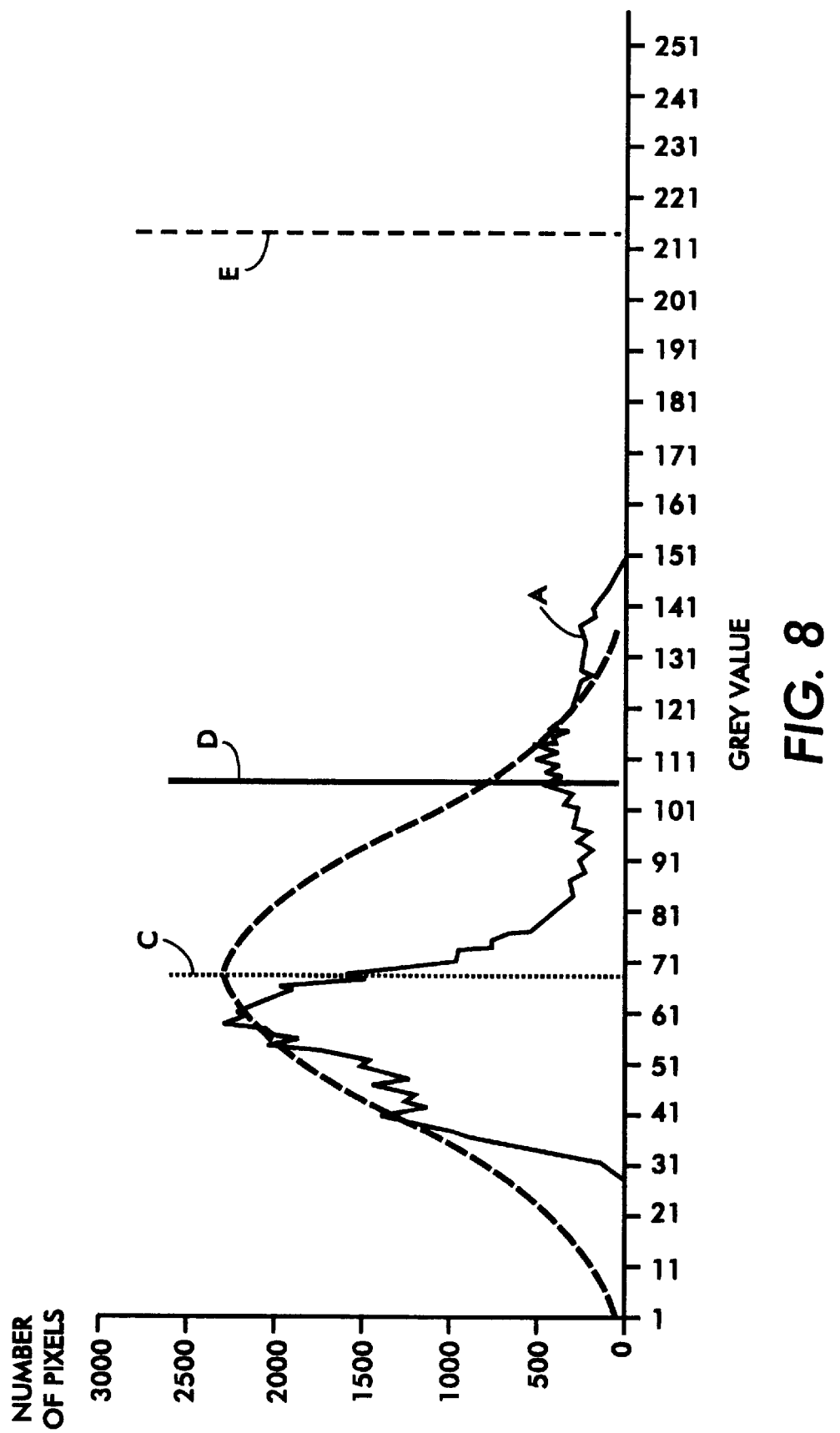
FIG. 8 is a graphical representation illustrating a histogram where the background value is estimated from a negative-slope side of a distribution.

Lastly, FIG. 8 illustrates an example of a histogram where both the two sigma and one sigma values can not be found so the background was estimated from the negative-slope side of the background distribution. As illustrated in FIG. 8, the histogram data is represented by line A, while a true histogram Gaussian approximation is represented by line B. Utilizing the concepts and processes of the present invention, the background peak value for the histogram illustrated in FIG. 8 was determined to be grey level 132. Moreover, when scanning the same image utilizing a sample window of the image, the peak grey value was also determined to be 130 by the present invention. Furthermore, as illustrated in FIG. 8, line C represents the four sigma point of the histogram from the sample window, while line D represents the four sigma point of the histogram distribution wherein the histogram is of the entire scanned image. Lastly, line E represents the four sigma point of the Gaussian approximation.

In summary, the present invention provides a process for generating histogram data and utilizing this histogram data to determine the background value and black threshold value of the image wherein these values are utilized in processing the image for reproduction. The present invention generates the histogram data by either scanning the entire image or only scanning a portion of the image through a sample window. This histogram data is then analyzed to determine the background peak value, the quarter (¼) peak background value, the valley value, the black peak value, and the quarter black peak value. From these various peak values, the present invention determines the process background value and the process black threshold value to be utilized in the image processing operations. In this approach, the present invention is insensitive to the image composition in the sampled area while being sensitive to intensity variations within the documents background, thereby reducing the chance of thinning or loss of fine lines and characters in the output copy of the image.

Although the present invention has been described in detail above, various modifications can be implemented without imparting from the spirit.

For example, the present invention has been described with respect to a black and white system However, the concepts of the present invention can be extended to a color application wherein the histogram data and processing is carried out in each color space. Moreover, the present invention has been described with respect to a system having 255 grey levels. However, the system can be easily applicable to any number of grey levels.

While the present invention has been described with reference to various embodiments disclosed above, it is not confined to the details to support the above, but is intended to cover such modification or changes as may come within the scope of the attached claims.

What is claimed is:

1. A method for generating a histogram of a scanned image, comprising the steps of:
    (a) determining a number of pixels of the image to be scanned to generate the histogram;
    (b) determining if the number of pixels determined in said step (a) is less than or equal to a capacity of a histogram buffer;
    (c) scanning the image to generate pixels having grey values associated therewith; and
    (d) storing a portion of the generated pixels in the histogram buffer when said step (b) determines that the number of pixels exceed the capacity of the histogram buffer, thereby generating a histogram of the image;
    said step (d) storing every other pixel when said step (b) determines that the number of pixels exceeds the capacity of the histogram buffer such that only odd-numbered pixels in odd-numbered scanlines and even-numbered pixels in even-numbered scanlines are stored in the histogram buffer.

2. The method as claimed in claim 1, further comprising the step of:
    (e) generating a plurality of subsample windows having a determined number of pixels when said step (b) determines that the number of pixels exceed the capacity of the histogram buffer;
    said step (d) stores every other pixel when said step (b) determines that the number of pixels exceeds the capacity of the histogram buffer such that only odd-numbered pixels in odd-numbered scanlines and even-numbered pixels in even-numbered scanlines are stored in the histogram buffer.

3. The method as claimed in claim 1, further comprising the step of:
    (e) generating a plurality of subsample windows having a determined number of pixels when said step (b) determines that the number of pixels exceed the capacity of the histogram buffer;
    said step (d) stores every other pixel when said step (b) determines that the number of pixels exceeds the capacity of the histogram buffer such that only odd-numbered pixels in odd-numbered scanlines and even-numbered pixels in even-numbered scanlines are stored in the histogram buffer, the subsample window being a single scanline wide.

4. The method as claimed in claim 1, wherein said step (a) determines the number of possible pixels from a desired scanning resolution input from a user.

5. The method as claimed in claim 1, wherein said step (a) determines the number of possible pixels from an original image size value input by a user.

6. The method as claimed in claim 1, wherein said step (a) determines the number of possible pixels from an original image size value measured by a scanning device.

7. A system for generating a histogram of a scanned image, comprising:
    a histogram buffer;
    means for determining a number of pixels of the image to be scanned to generate the histogram;
    comparator means for determining if the determined number of pixels is less than or equal to a capacity of said histogram buffer;
    a scanning device to scan the image to generate a plurality of pixels having grey values associated therewith; and
    gate means for passes a portion of the generated pixels to said histogram buffer when the determined number of pixels exceed the capacity of said histogram buffer, thereby generating a histogram of the image;
    said gates means passing every other pixel when the determined number of pixels exceeds the capacity of said histogram buffer such that only odd-numbered pixels in odd-numbered scanlines and even-numbered pixels in even-numbered scanlines are stored in said histogram buffer.

8. The system as claimed in claim 7, further comprising:
    control means for generating a plurality of subsample windows having a calculated number of pixels when the number of pixels exceeds the capacity of the histogram buffer;
    gate means passes every other pixel when the determined number of pixels exceeds the capacity of said histogram buffer such that only odd-numbered pixels in odd-numbered scanlines and even-numbered pixels in even-numbered scanlines are stored in said histogram buffer.

9. The system as claimed in claim 7, further comprising the step of:
    control means for generating a plurality of subsample windows having a calculated number of pixels when the number of pixels exceeds the capacity of the histogram buffer;
    said gate means passes every other pixel when the determined number of pixels exceeds the capacity of said histogram buffer such that only odd-numbered pixels in odd-numbered scanlines and even-numbered pixels in even-numbered scanlines are stored in said histogram buffer, the subsample window being a single scanline wide.

* * * * *